(12) United States Patent
Cain et al.

(10) Patent No.: US 8,096,507 B2
(45) Date of Patent: Jan. 17, 2012

(54) METHODS AND APPARATUS FOR OPTICAL PROPAGATION IMPROVEMENT SYSTEM

(75) Inventors: Alan B. Cain, Chesterfield, MO (US); Eric J. Jumper, Granger, IN (US); Donald J. Wittich, III, South Bend, IN (US); Edward J. Kerschen, Tucson, AZ (US); David Cavalieri, Granger, IN (US); T. Terry Ng, Sylvania, OH (US)

(73) Assignees: Innovative Technology Applications, Chesterfield, MO (US); University of Notre Dame Du Lac, Notre Dame, IN (US)

( * ) Notice: Subject to any disclaimer, the term of this patent is extended or adjusted under 35 U.S.C. 154(b) by 386 days.

(21) Appl. No.: 12/359,064

(22) Filed: Jan. 23, 2009

(65) Prior Publication Data

US 2009/0242702 A1 Oct. 1, 2009

Related U.S. Application Data

(60) Provisional application No. 61/024,353, filed on Jan. 29, 2008.

(51) Int. Cl.
*B64C 1/38* (2006.01)
*B64D 7/00* (2006.01)

(52) U.S. Cl. .................. 244/130; 244/129.4; 244/1 N; 89/37.16; 343/705

(58) Field of Classification Search ............ 89/37.16, 89/37.21; 342/359; 343/705, 765; 244/130, 244/121, 198, 129.4, 1 N; 378/145
See application file for complete search history.

(56) References Cited

U.S. PATENT DOCUMENTS

| 2,033,768 | A | * | 3/1936 | Helwig .................. 89/37.16 |
| 2,409,405 | A | * | 10/1946 | Trotter .................. 89/37.17 |
| 3,693,913 | A | * | 9/1972 | Barland et al. ............. 244/130 |
| 5,288,036 | A | * | 2/1994 | Kompare ................. 244/17.11 |
| 5,699,981 | A | | 12/1997 | McGrath et al. |
| 5,806,789 | A | | 9/1998 | Boulware et al. |
| 6,056,237 | A | * | 5/2000 | Woodland ................ 244/3.15 |
| 6,375,118 | B1 | | 4/2002 | Kibens et al. |
| 6,405,975 | B1 | * | 6/2002 | Sankrithi et al. .............. 244/1 R |
| 6,614,012 | B2 | * | 9/2003 | Schneider et al. ............ 244/3.1 |
| 6,742,741 | B1 | * | 6/2004 | Rivoli .................. 244/12.1 |

(Continued)

OTHER PUBLICATIONS

E.J. Kerschen and A. B. Cain, Aeroacoustic Mode Trapping for a Wind Tunnel With a Cavity in the Wall, American Institute of Aeronautics and Astronautics, Jun. 2008, AIAA-2008-4213, pp. 1-14.

(Continued)

*Primary Examiner* — Robert Canfield
*Assistant Examiner* — Brent W Herring
(74) *Attorney, Agent, or Firm* — Wright Law Group, PLLC; Mark F. Wright; Mehul P. Patel

(57) ABSTRACT

An aircraft turret and fairing assembly for facilitating transmission of a directed energy beam from a directed energy device includes a turret section for directing an energy beam. The assembly also includes a fairing section aft of and adjacent to the turret section. Each of the turret section and the aft fairing section are coupled to an aircraft. The assembly also includes at least one sensor for detecting air speed of the aircraft and air pressure. The turret section and the aft fairing section are configured and positioned relative to one another to direct airflow for generating an aeroacoustic resonance within a desired frequency range in an area aft of the turret section.

55 Claims, 30 Drawing Sheets

U.S. PATENT DOCUMENTS

| | | | | |
|---|---|---|---|---|
| 6,929,214 | B2* | 8/2005 | Ackleson et al. | 244/1 R |
| 7,150,430 | B2* | 12/2006 | Silansky et al. | 244/30 |
| 7,215,474 | B2 | 5/2007 | Argueta-Diaz | |
| 7,686,257 | B2* | 3/2010 | Saddoughi et al. | 244/204 |
| 7,815,150 | B2* | 10/2010 | Vassberg et al. | 244/200.1 |
| 7,819,221 | B1* | 10/2010 | Lane et al. | 181/206 |
| 7,871,042 | B2* | 1/2011 | Velicki et al. | 244/135 R |
| 2008/0084475 | A1* | 4/2008 | Larrouqe et al. | 348/144 |

OTHER PUBLICATIONS

A. B. Cain, E. J. Jumper, D. J. Wittich, D. Cavalieri and E. J. Kerschen, An Optical Propagation Improvement System and the Importance of Aeroacoustics, American Institute of Aeronautics and Astronautics, Jun. 2008, AIAA-2008-4212, pp. 1-32.

E. J. Kerschen and A. B. Cain, Aeroacoustic Mode Trapping for a Wind Tunnel With a Cavity in the Wall, 39th AIAA Plasmadynamics and Lasers Conference, Jun. 23-26, 2008, pp. 1-24, Seattle, Washington.

A. B. Cain, T. T. Ng, E. J. Jumper, D. J. Wittich, D. Cavalieri and E. J. Kerschen, An Optical Propagation Improvement System and the Importance of Aeroacoustics, Dec. 12, 2007, pp. 1-27.

Alan B. Cain, T. Terry Ng, Eric Jumper, Ed Kerschen, D. J. Wittich and David Cavalieri, Optical Propagation Improvement System (OPIS), USAF, Air Force Research Laboratory, DES, Dec. 10, 2007, pp. 1-29.

A. B. Cain, T. T. Ng, E. J. Jumper. D. Cavalieri, D. J. Wittich and E. J. Kerschen, Optical Propagation Improvement System, Dec. 6, 2007, pp. 1-28.

\* cited by examiner

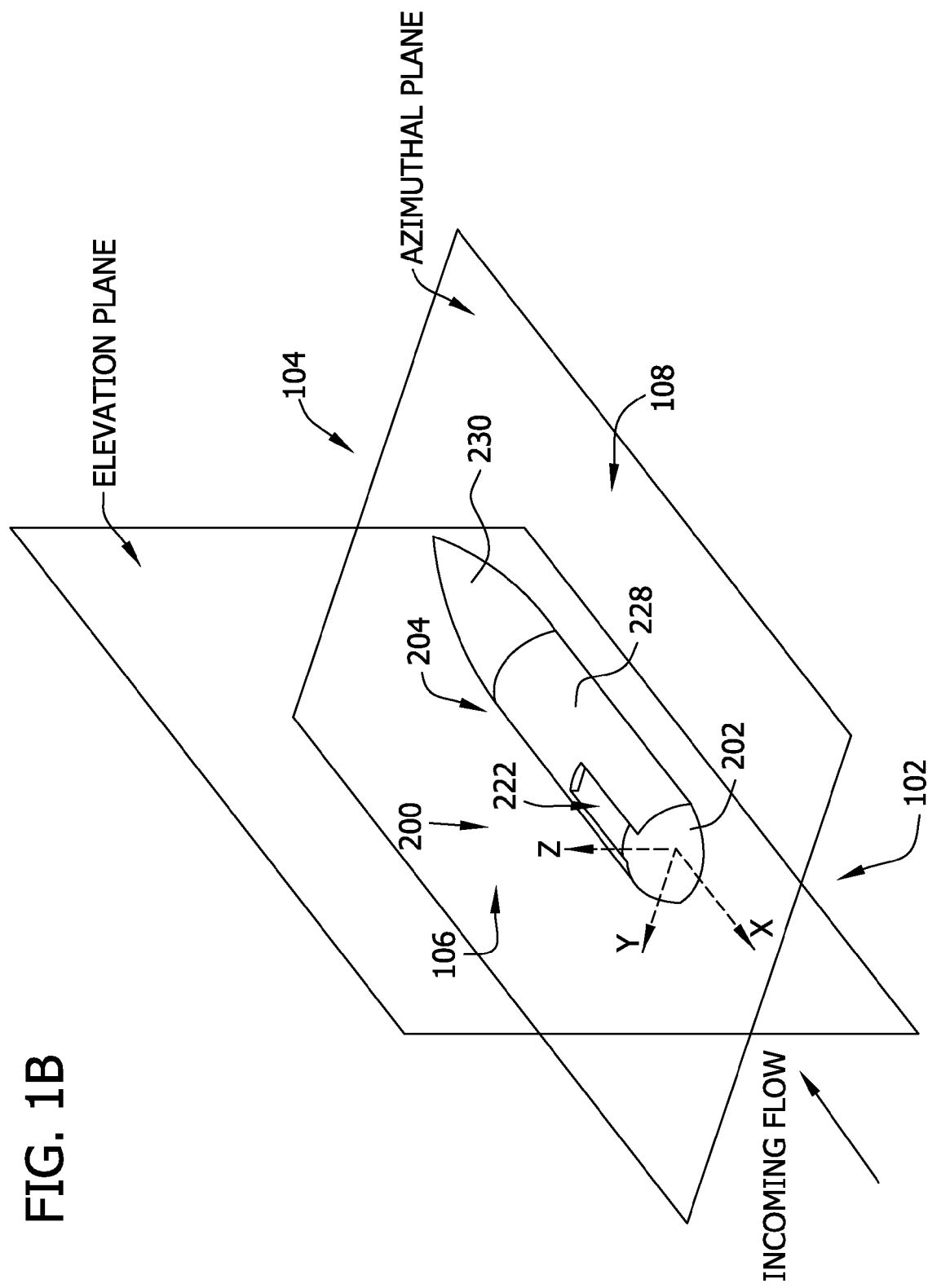

| Mach | Freq | Amp | |
|---|---|---|---|
| 0.475 | 1358 | 1.23E-03 | |
| 0.525 | 2494 | 1.09E-01 | ← First Highest Amplitude Response |
| 0.575 | 2469.5 | 6.66E-02 | ← Second Highest Amplitude Response |
| 0.675 | 2006.8 | 1.25E-04 | |

| Mach | Freq 1 | Amp 1 | Freq 2 | Amp 2 | Freq 3 | Amp 3 |
|---|---|---|---|---|---|---|
| 0.475 | 1310.8 | 1.28E-02 | 2452.4 | 1.40E-04 | 3452.8 | 1.50E-04 |
| 0.675 | 1520 | 5.97E-05 | | | | |

Highest Amplitude Response

1400

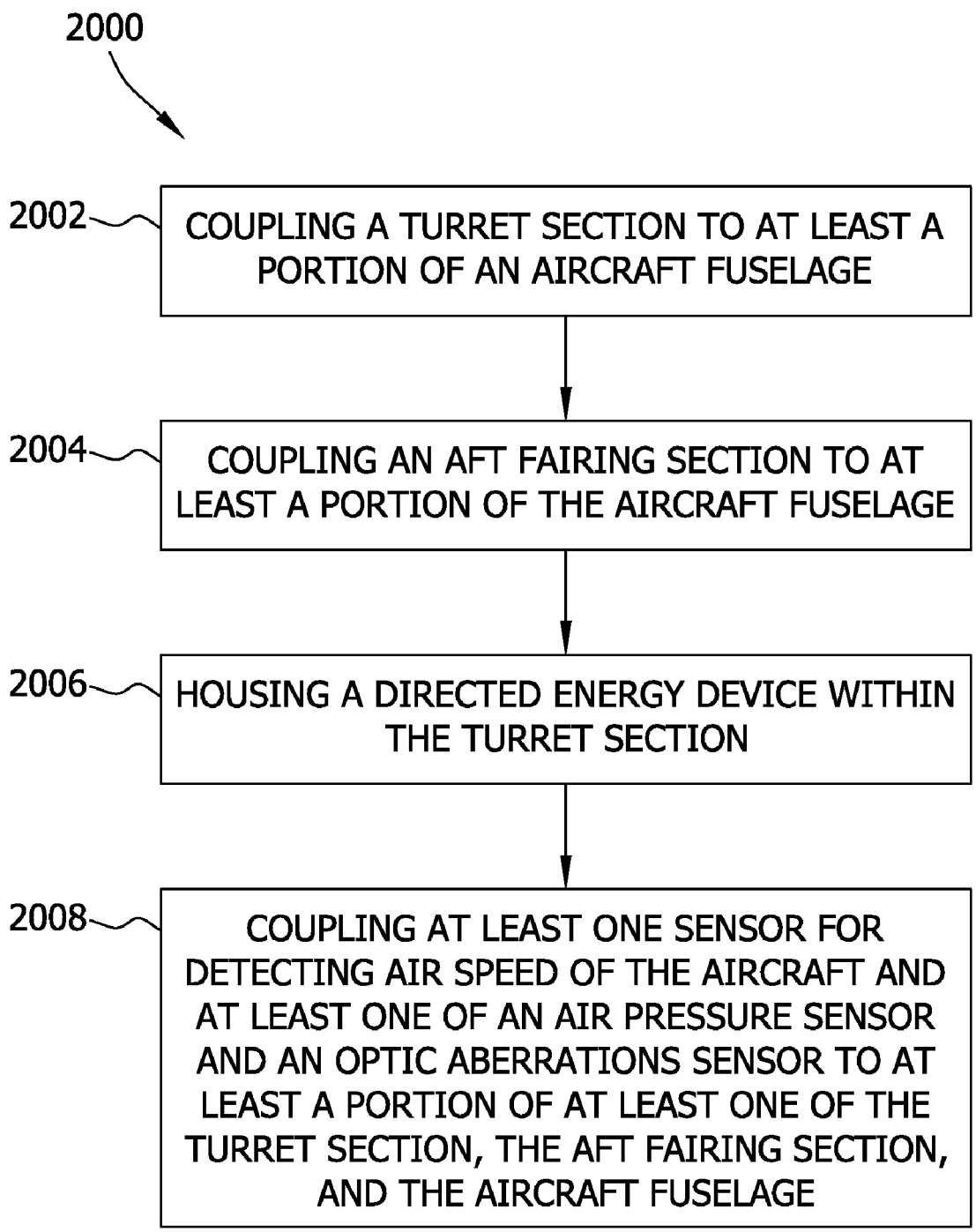

METHODS AND APPARATUS FOR OPTICAL PROPAGATION IMPROVEMENT SYSTEM

CROSS REFERENCE TO RELATED APPLICATIONS

This application claims the priority of Provisional Patent Application Ser. No. 61/024,353, which was filed on Jan. 29, 2008 and which is hereby incorporated by reference in its entirety.

STATEMENT REGARDING FEDERALLY SPONSORED RESEARCH & DEVELOPMENT

This invention was made with Government support under Government Contract No. FA9451-07-C-0029. The Government may have certain rights in this invention.

BACKGROUND OF THE INVENTION

This invention relates generally to aircraft sensor systems capable of detecting aeroacoustic resonances and disturbances and aero-optic aberrations in a fluid-dynamically active layer of airflow about an aircraft and methods to regularize such aberrations in characterized environments, and more specifically to utilizing such methods and systems with an aircraft for facilitating transmission of a directed energy (laser or microwave) beam from a directed energy device (weapon or communication system).

In at least some known cases, attempts have been made to mount directed energy systems to an aircraft. The aircraft is then used as an airborne platform for the directed energy systems. The directed energy systems are configured to generate a properly-configured-wavefront beam.

In at least some of these known attempts of mounting a directed energy system to an aircraft, the directed energy systems may be housed within turrets that are installed on the exterior of the aircraft with a fairing mounted aft of the turret. However, these known attempts have failed or have produced limited results because of the aero-optic aberrations or disturbances arising from density variations in the air flowing over the aircraft, especially in those cases where the directed energy system is pointed in the aft direction of the aircraft.

Specifically, at least some of these known attempts of transmitting an energy beam from an aircraft have included a directed energy system that directs the energy beam through a forward-looking and partially spherical sector extending between a straight ahead viewing line of the aircraft to about a 90° elevation. At least some other attempts have also included a directed energy system that is capable of directing the energy beam in a rearward direction through a sector extending beyond a 90° elevation. In both of these cases, where the energy beam is directed forwardly and/or rearwardly, results have been very poor due to a degradation of the energy beam. For example, at elevations greater than 90°, local aerodynamic flow separation on an aft face of the turret and fairing generates a turbulent shear layer having variations in air density, which results in variations in an index of refraction of the air, and in variations in the wavefront from its predetermined figure. Such wavefront variations shift portions of the energy beam out of phase with other portions of the beam. When portions of the energy beam are out of phase, the intensity of the beam at the target is significantly degraded. Accordingly, a system and method is needed for detecting the aero-optic aberrations in a shear layer of airflow about an aircraft such that these aberrations can be accounted for during the optical propagation of a directed energy beam from an aircraft.

BRIEF DESCRIPTION OF THE INVENTION

In one aspect, an aircraft turret and fairing assembly for facilitating transmission of a directed energy beam from a directed energy device is provided. The assembly includes a turret section for directing an energy beam. The assembly also includes a fairing section aft of and adjacent to said turret section. Each of the turret section and the aft fairing section coupled to an aircraft. The assembly also includes at least one sensor for detecting air speed of the aircraft and air pressure. The turret section and the aft fairing section are configured and positioned relative to one another to direct airflow for generating an aeroacoustic resonance within a desired frequency range in an area aft of the turret section.

In another aspect, an aircraft for facilitating transmission of a directed energy beam from a directed energy device coupled to the aircraft is provided. The aircraft includes a fuselage and an aircraft turret and fairing assembly for facilitating transmission of a directed energy beam from a directed energy device. The aircraft turret and fairing assembly includes a turret section for directing an energy beam. The assembly also includes a fairing section aft of and adjacent to said turret section. Each of the turret section and the aft fairing section coupled to an aircraft. The assembly also includes at least one sensor for detecting air speed of the aircraft and air pressure. The turret section and the aft fairing section are configured and positioned relative to one another to direct airflow for generating an aeroacoustic resonance within a desired frequency range in an area aft of the turret section.

In a further aspect, a method of assembling an aircraft turret and fairing assembly for housing an aircraft-borne directed energy system configured to generate and transmit a directed energy beam is provided. The method includes coupling a turret section to at least a portion of an aircraft fuselage. The method also includes coupling an aft fairing section to at least a portion of the aircraft fuselage. The aft fairing section is positioned aft of and adjacent to the turret section. The method further includes housing a directed energy device within the turret section. The method also includes coupling at least one sensor for detecting air speed of the aircraft and at least one of air pressure and optic aberrations to at least a portion of at least one of the turret section, the aft fairing section, and the aircraft fuselage. The turret section and the aft fairing section are configured and positioned relative to one another to direct airflow for generating an aeroacoustic resonance within a desired frequency range in an area aft of the turret section.

In another aspect, an optical propagation improvement system coupled to a directed energy device is provided. The directed energy device is configured to generate and transmit a directed energy beam. The optical propagation improvement system includes at least one air speed sensor and at least one of at least one air pressure transducer and at least one optical aberration sensor. The system also includes a computer processor coupled with the at least one air speed sensor and the at least one of at least one air pressure transducer and at least one optical aberration sensor. The computer processor is configured to determine effects of a separated turbulent shear layer on the directed energy beam including distortions to a phase of the energy beam's wavefront. The computer processor is also configured to determine an adjusted phase of the directed energy beam prior to transmission through the separated turbulent shear layer based on the determined effects such that the energy beam's wavefront is optimized after transmission through the separated turbulent shear layer. The directed energy system includes an adaptive optic device that is configured to generate and transmit the directed energy beam. The adaptive optic device is coupled to the computer processor and the computer processor is configured to adjust the phase of the energy beam's wavefront prior to transmission through the separated turbulent shear layer such that the energy beam's wavefront is optimized after transmission through the separated turbulent shear layer. The at least one air pressure transducer includes a plurality of air pressure transducers. The at least one optical aberration sensor includes a plurality of optical aberration sensors. Each of the plurality of air pressure transducers and optical aberration sensors is positioned within a cavity defined within a portion of an aircraft. At least one of the plurality of air pressure transducers and optical aberration sensors is positioned within a forward portion of the cavity and at least one of the plurality of air pressure transducers and optical aberration sensors is positioned within an aft portion of the cavity. The system further includes a rigid material cover that extends radially outward a first distance from an aircraft fuselage. A turret section of the directed energy system extends radially outward a second distance from the aircraft fuselage. The first distance is greater than the second distance and a difference between the first distance and the second distance facilitates directing of airflow to generate aeroacoustic resonances that facilitate regularizing concomitant aero-optic aberrations based on a predetermined range of air speed. The aeroacoustic resonances are at least partially manifested as quasi-periodic air pressure oscillations within the cavity that stimulate coherent motions of a separated turbulent shear layer that spans the cavity. The at least one air pressure transducer is configured to generate and transmit an air pressure signal that is substantially representative of air pressure in the vicinity of the air pressure transducer. The at least one optical aberration sensor is configured to generate and transmit an aberrated wavefront signal that is substantially representative of wavefronts in the vicinity of the optical aberration sensor. The at least one air speed sensor is configured to generate and transmit an air speed signal that is substantially representative of air speed in the vicinity of the directed energy device. The computer processor is programmed with aeroacoustic resonance data that includes aeroacoustic resonance frequency and aeroacoustic resonance amplitude values as a function of at least one of aircraft speed signals and cavity air pressure signals and wavefront aberration signals. The computer processor is programmed to determine a real time frequency and amplitude of an associated aeroacoustic resonance as a function of aircraft speed signals and cavity air pressure signals.

In a further aspect, an aircraft is provided. The aircraft includes an aircraft fuselage and a turret section coupled to the aircraft fuselage. The aircraft also includes a directed energy device at least partially enclosed within the turret section. The directed energy device is configured to generate and transmit a directed energy beam. The aircraft further includes an optical propagation improvement system coupled to the directed energy device. The optical propagation improvement system includes at least one air speed sensor and at least one of at least one air pressure transducer and at least one optical aberration sensor. The system also includes a computer processor coupled with the at least one air speed sensor and the at least one of at least one air pressure transducer and at least one optical aberration sensor. The computer processor is configured to determine effects of a separated turbulent shear layer on the directed energy beam including distortions to a phase of the energy beam's wavefront. The computer processor is also configured to determine an adjusted phase of the directed energy beam prior to transmission through the separated turbulent shear layer based on the determined effects such that the energy beam's wavefront is optimized after transmission through the separated turbulent shear layer. The directed energy system includes an adaptive optic device that is configured to generate and transmit the directed energy beam. The adaptive optic device is coupled to the computer processor and the computer processor is configured to adjust the phase of the energy beam's wavefront prior to transmission through the separated turbulent shear layer such that the energy beam's wavefront is optimized after transmission through the separated turbulent shear layer. The at least one air pressure transducer includes a plurality of air pressure transducers. The at least one optical aberration sensor includes a plurality of optical aberration sensors. Each of the plurality of air pressure transducers and optical aberration sensors is positioned within a cavity defined within a portion of the aircraft. At least one of the plurality of air pressure transducers and optical aberration sensors is positioned within a forward portion of the cavity and at least one of the plurality of air pressure transducers and optical aberration sensors is positioned within an aft portion of the cavity. The system further includes a rigid material cover that extends radially outward a first distance from the aircraft fuselage. A turret section of the directed energy system extends radially outward a second distance from the aircraft fuselage. The first distance is greater than the second distance and a difference between the first distance and the second distance facilitates directing of airflow to generate aeroacoustic resonances that facilitate regularizing concomitant aero-optic aberrations based on a predetermined range of air speed. The aeroacoustic resonances are at least partially manifested as quasi-periodic air pressure oscillations within the cavity that stimulate coherent motions of a separated turbulent shear layer that spans the cavity. The at least one air pressure transducer is configured to generate and transmit an air pressure signal that is substantially representative of air pressure in the vicinity of the air pressure transducer. The at least one optical aberration sensor is configured to generate and transmit an aberrated wavefront signal that is substantially representative of wavefronts in the vicinity of the optical aberration sensor. The at least one air speed sensor is configured to generate and transmit an air speed signal that is substantially representative of air speed in the vicinity of the directed energy device. The computer processor is programmed with aeroacoustic resonance data that includes aeroacoustic resonance frequency and aeroacoustic resonance amplitude values as a function of at least one of aircraft speed signals and cavity air pressure signals and wavefront aberration signals. The computer processor is programmed to determine a real time frequency and amplitude of an associated aeroacoustic resonance as a function of aircraft speed signals and cavity air pressure signals.

In another aspect, a method for facilitating optical propagation of a directed energy beam is provided. The method includes generating at least one aircraft speed signal that is substantially representative of a measured air speed of an aircraft. The method also includes generating at least one of a cavity air pressure signal that is substantially representative of at least one measured air pressure within a cavity that is defined within at least a portion of the aircraft and a cavity wavefront aberration signal that is substantially representative of at least one measured aberrated wavefront within the cavity. The method further includes receiving the at least one aircraft speed signal and at least one of the at least one cavity air pressure signal and wavefront aberration signal at a computer processor. The method also includes transmitting a directed energy beam with a conjugate wavefront. Transmitting a directed energy beam with a conjugate wavefront includes determining effects of a separated turbulent shear layer on the directed energy beam including distortions to a phase of the energy beam's wavefront. Transmitting a directed energy beam with a conjugate wavefront also includes determining an adjusted phase of the directed energy beam prior to transmission through the separated turbulent shear layer based on the determined effects such that the energy beam's wavefront is in phase, or optimized, after transmission through the separated turbulent shear layer. Transmitting a directed energy beam with a conjugate wavefront further includes adjusting an adaptive optic device to generate and transmit the directed energy beam. Adjusting an adaptive optic device to generate and transmit the directed energy beam includes adjusting the phase of the directed energy beam's wavefront prior to transmission through the separated turbulent shear layer such that the energy beam's wavefront is optimized after transmission through the separated turbulent shear layer. Transmitting a directed energy beam with a conjugate wavefront also includes directing airflow about at least a portion of the aircraft to generate aeroacoustic resonances, thereby facilitating regularization of concomitant aero-optic aberrations based on a predetermined range of air speed. The aeroacoustic resonances are at least partially manifested as quasi-periodic air pressure oscillations within the cavity that stimulate coherent motions of a separated turbulent shear layer that spans the cavity. Receiving the at least one aircraft speed signal and at least one of the at least one cavity air pressure signal and wavefront aberration signal within a computer processor includes programming the computer processor with aeroacoustic resonance data that includes aeroacoustic resonance frequency and aeroacoustic resonance amplitude values as a function of at least one of aircraft speed signals, cavity air pressure signals, and cavity wavefront aberration signals. Receiving the at least one aircraft speed signal and the at least one cavity air pressure signal and wavefront aberration signal within a computer processor also includes programming the computer processor with to determine a real time frequency and amplitude of an associated aeroacoustic resonance as a function of aircraft speed signals and cavity air pressure signals. Generating at least one cavity air pressure signal includes generating a plurality of cavity air pressure signals. At least one of the air pressure signals is substantially representative of air pressure oscillations in a forward portion of the cavity and at least one of air pressure signals is substantially representative of air pressure oscillations in an aft portion of the cavity. Generating at least one cavity wavefront aberration signal includes generating a plurality of cavity wavefront aberration signals. At least one of the wavefront aberration signals is substantially representative of wavefront aberrations in a forward portion of the cavity and at least one of wavefront aberration signals is substantially representative of wavefront aberrations in an aft portion of the cavity.

BRIEF DESCRIPTION OF THE DRAWINGS

FIG. 1B is a perspective view of the turret and fairing assembly shown in FIG. 1A;

FIG. 16 is a tabular view of frequency and amplitude data associated with the second cavity in tunnel wall analysis as shown in FIG. 13;

FIG. 25 is a flow chart illustrating an exemplary method for determining a configuration for the exemplary turret and fairing assembly shown in FIGS. 1A, 1B, 2, 3, 4, 5, and 6;

DETAILED DESCRIPTION OF THE INVENTION

The effectiveness of a directed energy (laser or microwave) weapon or communication system mounted to an airborne platform, such as an aircraft, is significantly limited by aero-optic aberrations arising from density variations in air flowing over the aircraft. This lack of effectiveness is most limiting in the case where the directed energy laser system is pointed in the aft direction of the aircraft. The systems and methods described herein include a turret and fairing assembly that increases the effectiveness of a directed energy beam and increases a field of regard for propagation of the energy beam from an airborne platform flying at up to transonic speed. The example embodiment described herein incorporates a fairing section that includes a tuned cavity positioned between a tapered fairing portion and an aft fairing portion that excites a resonance mode of the airflow and causes the optical aberrations imposed by the shear layer to become more predictable over the entire Mach number range. The cavity, or some portion of it, will be exposed to the external airflow when the fairing structure would otherwise inhibit propagation of the directed energy beam, or when the beam would otherwise be required to propagate through aero-optic aberrations caused by transonic shock or flow separation. The methods and systems described herein are designed to regularize optical aberrations caused by airflow around an aircraft at high speeds, and correct a directed energy beam being transmitted from the aircraft such that the energy beam can be effectively propagated through a controlled shear layer.

Figure 1A:
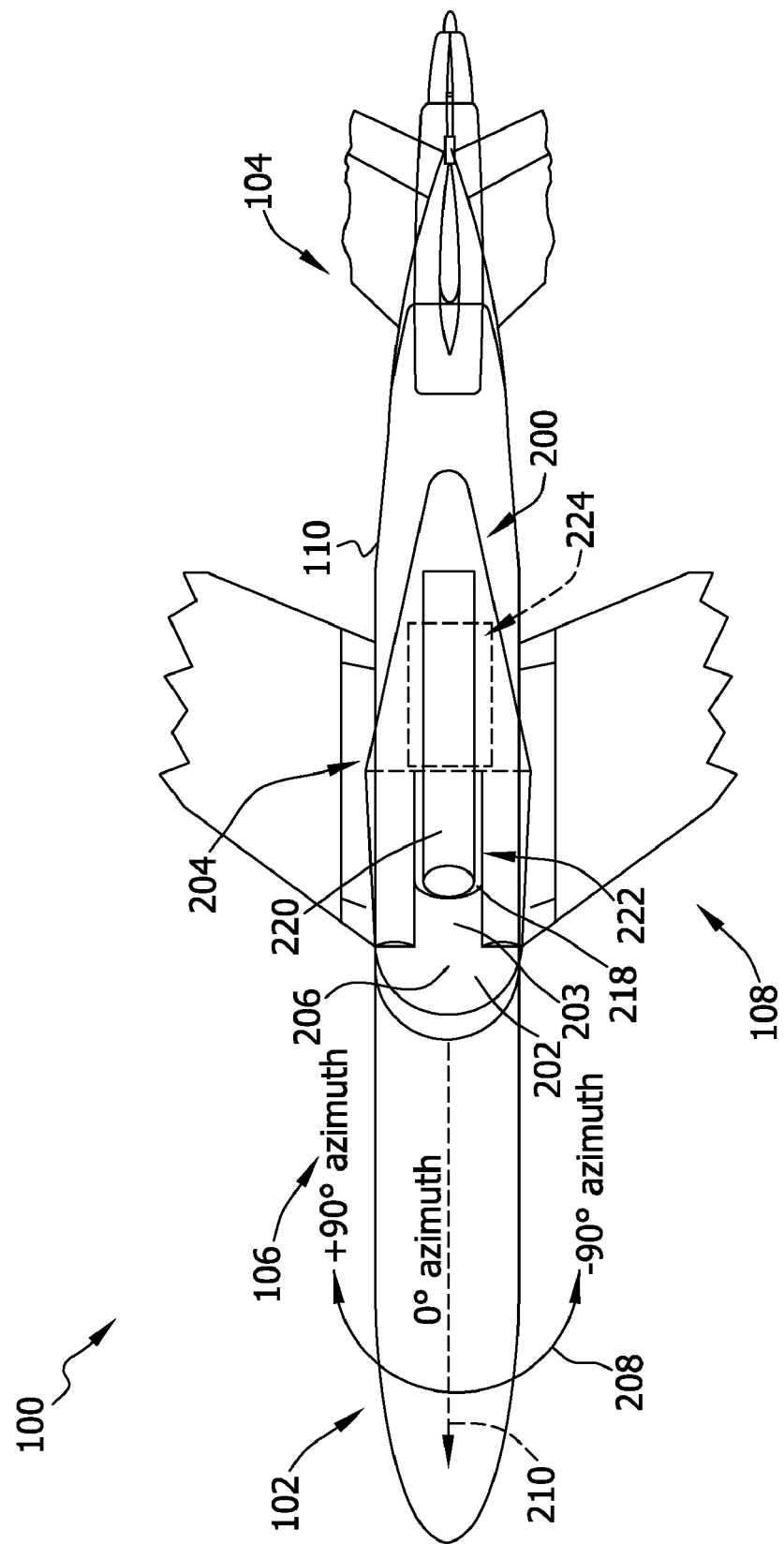
FIG. 1A is an overhead view of an exemplary aircraft with an exemplary turret and fairing assembly.
Figure 2:
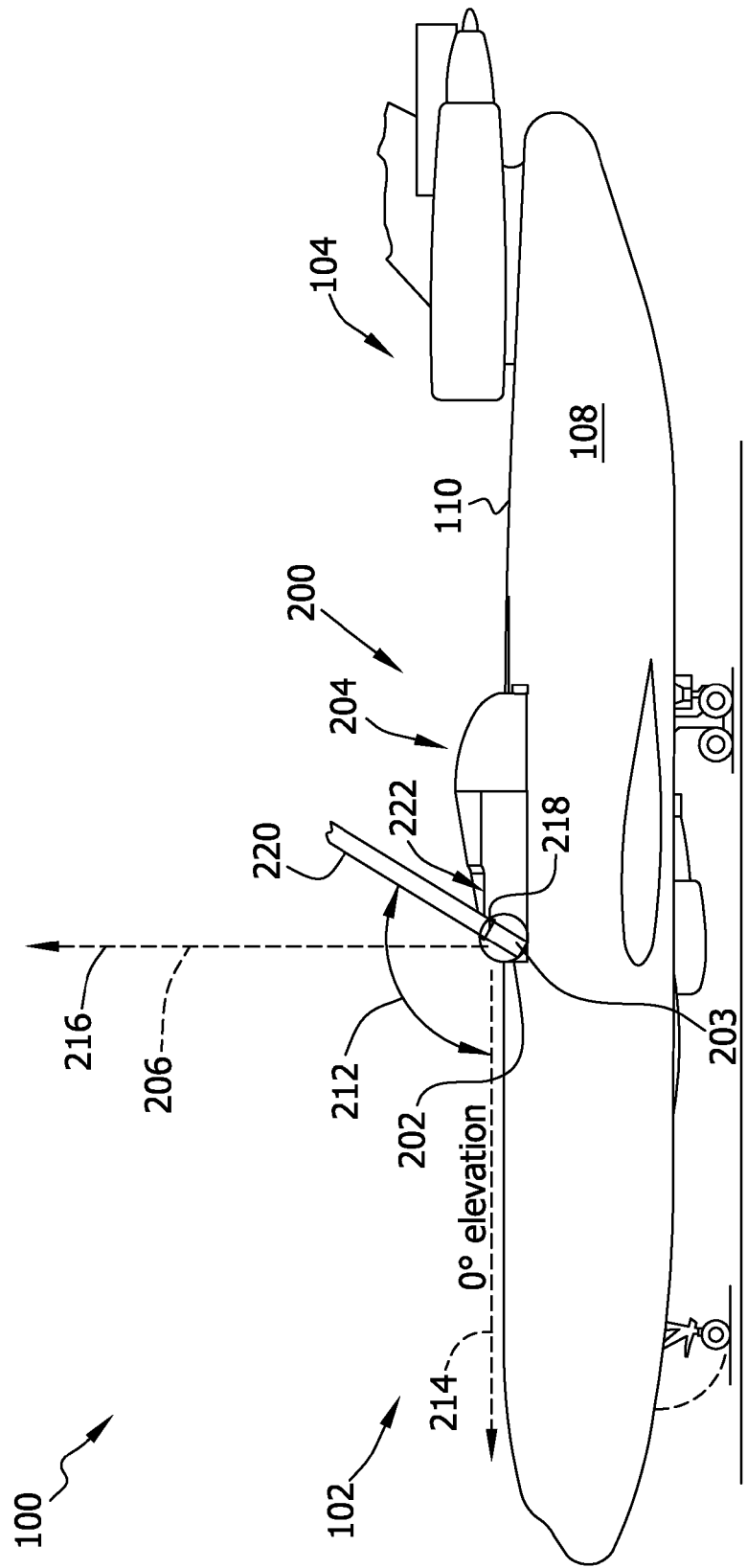
FIG. 2 is a side view of the exemplary aircraft shown in FIG. 1.

FIG. 1A is an overhead view of an exemplary aircraft 100 with an exemplary turret and fairing assembly 200. FIG. 1B is a perspective view of turret and fairing assembly 200. FIG. 2 is a side view of aircraft 100 with turret and fairing assembly 200 (also shown in FIG. 1). FIGS. 1, 1B, and 2 are discussed in tandem. Aircraft 100 includes a fore portion 102, an aft portion 104, a starboard side 106, and a port side 108. Aircraft 100 also includes an aircraft fuselage 110 and assembly 200 is fixedly coupled to fuselage 110. Turret and fairing assembly 200 includes a spherical turret section 202, which in turn houses a directed energy device 203, or an equivalent means for transmitting energy from a similar device (not shown). Turret section 202 is mounted to a cylindrical, rotatable base (not shown in FIGS. 1A, 1B, and 2) and is coupled to an aerodynamic aft fairing section 204. In the example embodiment, aft fairing section 204 has a substantially expanding conical shape and is substantially radially symmetrical.

FIG. 1B illustrates a coordinate system that is associated with turret and fairing assembly 200, however, since assembly 200 may be positioned on almost any portion of aircraft 100, the coordinated system may not necessarily be associated with aircraft 100. A primary axis, that is an x-axis of this relative coordinate system is parallel to incoming flow. The x-axis originates at the center of turret section 202, is considered positive in the direction into the incoming flow as indicated by the arrow, and is sometimes referred to as a "roll axis". A secondary axis, that is a y-axis of this relative coordinate system is perpendicular to the x-axis, originates at the center of turret section 202, is considered positive in the direction as indicated by the arrow, and is sometimes referred to as a "pitch axis". A tertiary axis, that is a z-axis of this relative coordinate system is orthogonal to both the x-axis and the y-axis, originates at the center of turret section 202, is considered positive in the direction away from aircraft 100 as indicated by the arrow, and is sometimes referred to as a "yaw axis". The x-axis and the y-axis define an azimuthal plane that is substantially parallel to the incoming flow. The x-axis and the z-axis define an elevation plane that substantially bifurcates assembly 200.

Turret section 202 is mounted such that it is capable of slewing in two independent degrees of freedom. The first degree of freedom (DOF) about which turret section 202 is capable of rotating is the axis commonly referred to as the pitch axis (y-axis). Rotation about this axis enables the turret to transmit energy in the elevation plane. The second degree of freedom about which the turret is capable of rotating is the axis commonly referred to as the yaw axis (z-axis). Rotation about this axis enables the turret to transmit energy in the azimuth plane. When these two degrees of freedom (DOF) are exercised together turret section 202 is capable of transmitting energy through a field of view (FOV) comprising the volume of space totally accessible throughout the enclosed volume defined by the maximum range of rotation angles of each degree of freedom.

Turret section 202 rotates about the yaw axis (z-axis) as shown in symmetrically to define an azimuthal angle 208 over a possible full range of approximately +90° (due starboard) to approximately −90° (due port) with reference to a 0° azimuth 210 (due forward) in the azimuth plane. Also, turret section 202 is capable of rotating about the pitch axis (y-axis) to define an elevation angle 212 over a possible full range of approximately 0° (due forward) to approximately 180° (due aft) with reference to a 0° elevation 214 and a 90° elevation 216 in the elevation plane. In the exemplary embodiment, and as illustrated in FIG. 2, azimuthal axis of symmetry 206 and 0° elevation 2164 are substantially coincident.

Such flexibility in the azimuthal and elevation directions facilitates turret section 202 to have two degrees of freedom (DOF) that provide the ability for an aperture 218 of directed energy device 203 to point an exiting directed energy beam 220 through a possible hemispherical volume of space outside of aircraft 100. However, a need for effective aerodynamic design for the aft components, including, but not limited to aft fairing section 204, limits the range of elevation of directed energy device 203 between about 0° elevation 214 and 90° elevation 216 along elevation angle 212, and therefore, limits the "field of regard" (FOR) to less than that of a true hemisphere. In the exemplary embodiment, a cutout 222 in aft fairing section 204 enables directed energy device 203 to elevate more than 90°, and therefore, provides a FOR closer to a full hemisphere. In an alternative embodiment, aft fairing section 204 is rotatable about an alternative azimuthal axis of symmetry that is parallel to axis 206, and which itself passes through a theoretical center of the hemisphere. The length (not shown in FIGS. 1 and 2) of cutout 222 along aft fairing section 204 to turret section 202 at least partially determines the range for FOR, wherein as the length of cutout 222 increases, a larger volume in space is covered approaching that of a full hemisphere in space. Aft fairing section 204 that includes a tuned cavity 224 positioned between tapered fairing portion 226 and aftmost fairing portion 230 is capable of rotating about the roll axis (x-axis) giving it one degree of freedom. It rotates in coordination with turret section 202 such that the centerline of beam 220 exiting turret section 202 is coplanar with the sidewalls (not shown) of cavity 224.

The exemplary embodiment of turret and fairing assembly 200 incorporates a cavity 224 within aft fairing section 204 wherein cavity 224 is discussed in more detail below. Alternative embodiments may include extending cutout 222 and/or defining another opening (not shown) in aft fairing section 204 that would allow beam 220 to achieve a greater "look-back" angle with respect to elevation and thereby more effectively utilize the two degrees of freedom. Moreover, components aft of turret section 202 may have lower profiles to facilitate achieving a greater look-back angle. Therefore, the systems described herein may include any combination of such embodiments for facilitating a maximum desired look-back angle.

In the exemplary embodiment, assembly 200 is positioned on top of aircraft 100. Alternatively, assembly 200 is positioned on the bottom of aircraft 100. Also, alternatively, assembly 200 is positioned anywhere on aircraft 100 that enables assembly 200 and aircraft 100 to operate as described herein. In the exemplary embodiment, aircraft 100 and assembly 200 are capable of operation with subsonic and transonic air speed ranges.

Figure 3:
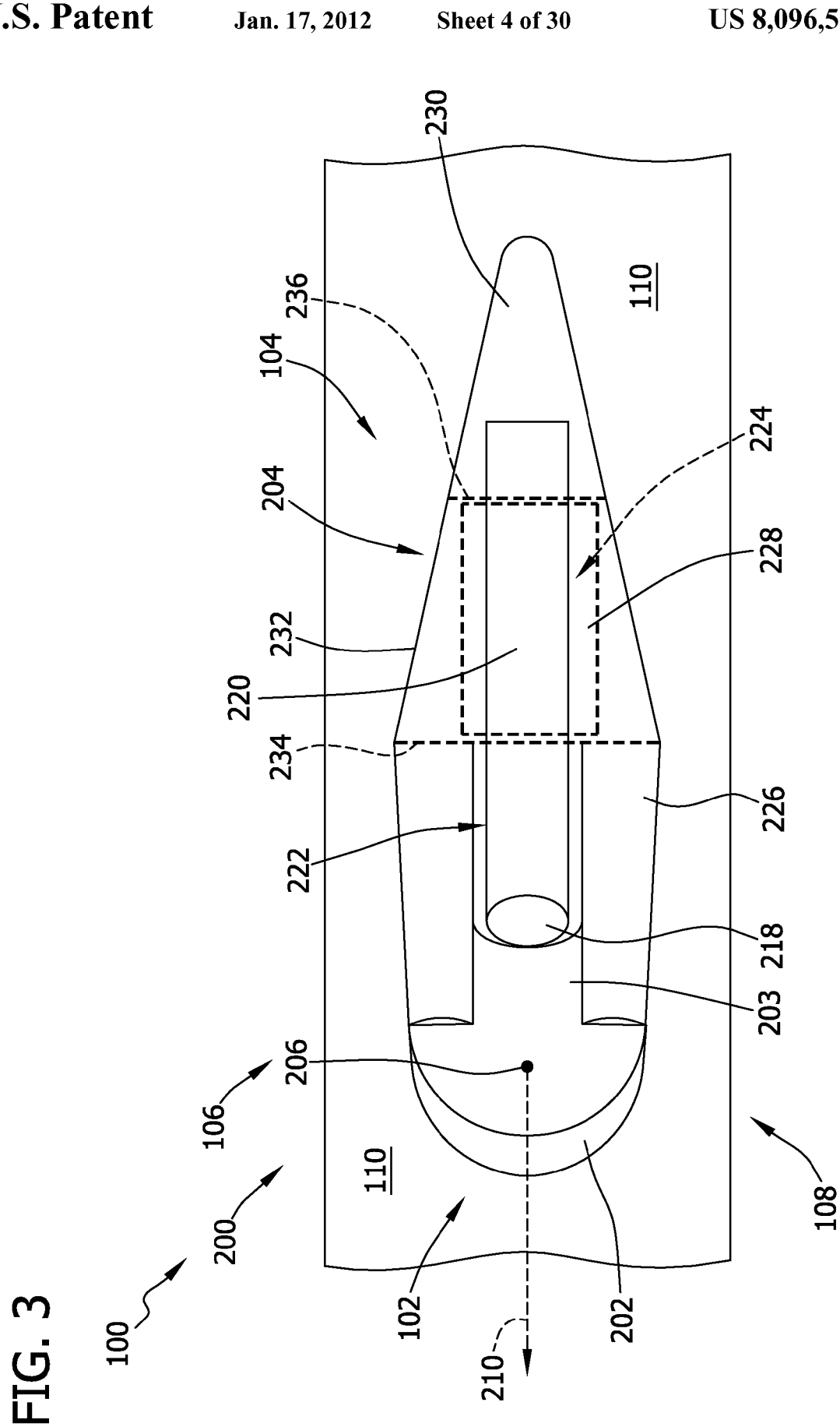
FIG. 3 is an overhead view of the exemplary turret and fairing assembly that may be used with the aircraft shown in FIGS. 1 and 2.
Figure 4:
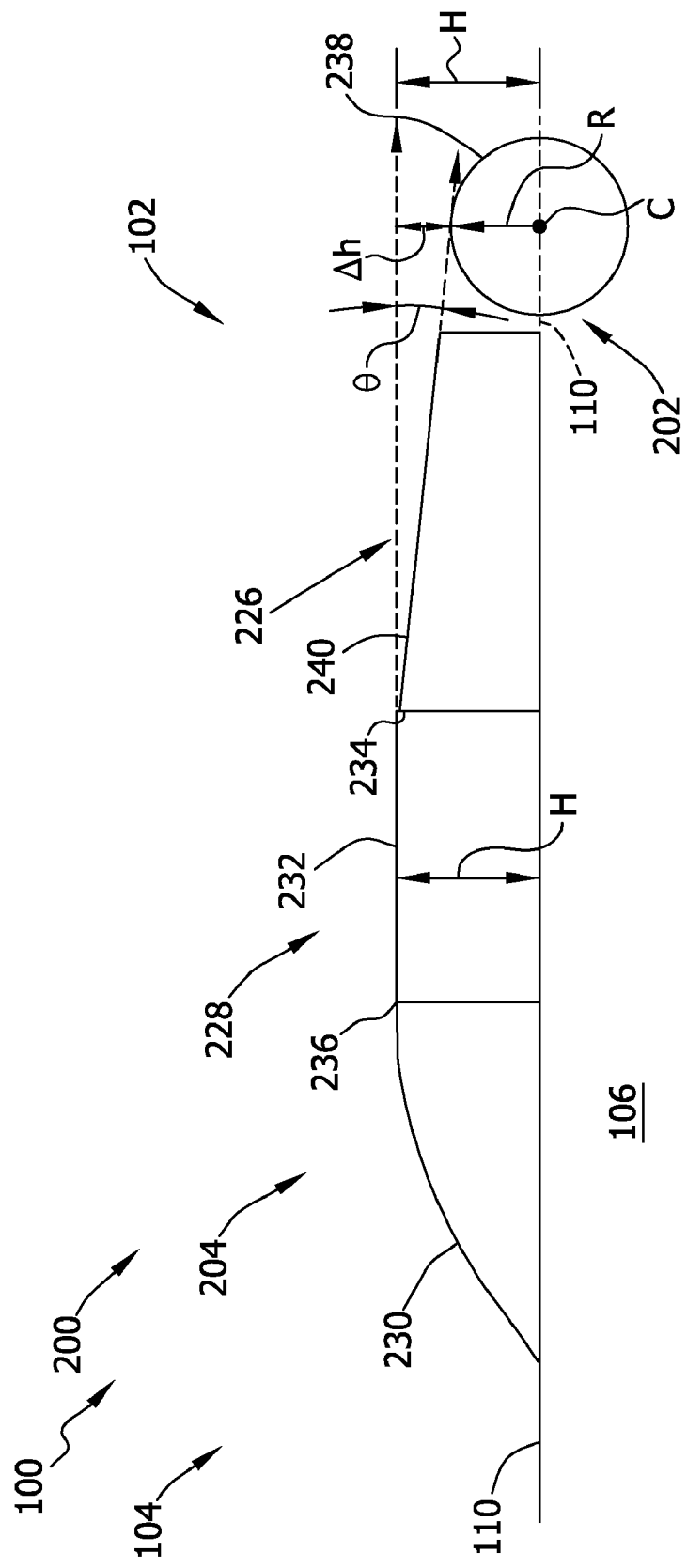
FIG. 4 is a side view of an aft fairing that may be used with the turret and fairing assembly shown in FIG. 3.
Figure 5:
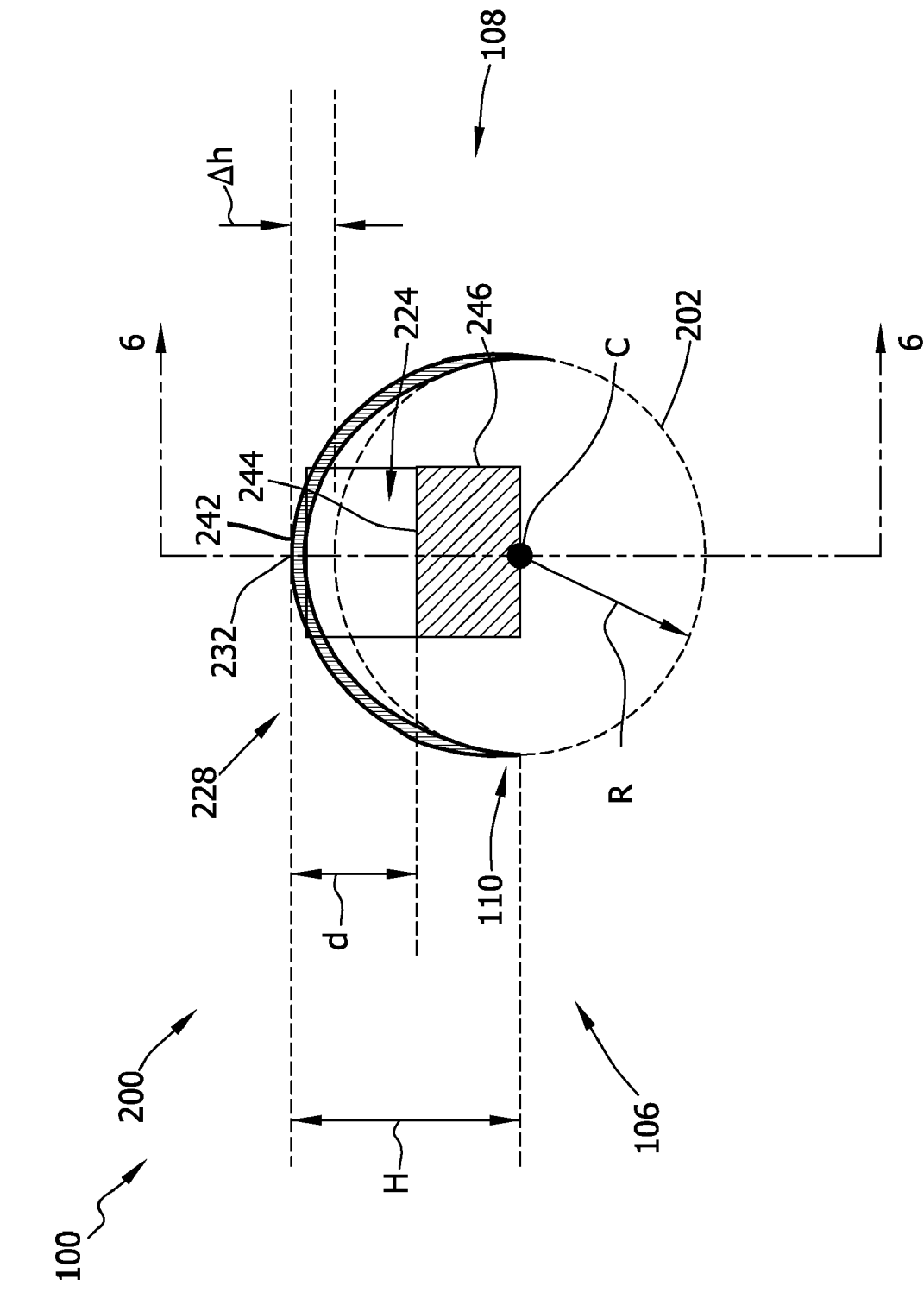
FIG. 5 is a fore-to-aft view of a portion of the turret and fairing assembly shown in FIG. 3.
Figure 6:
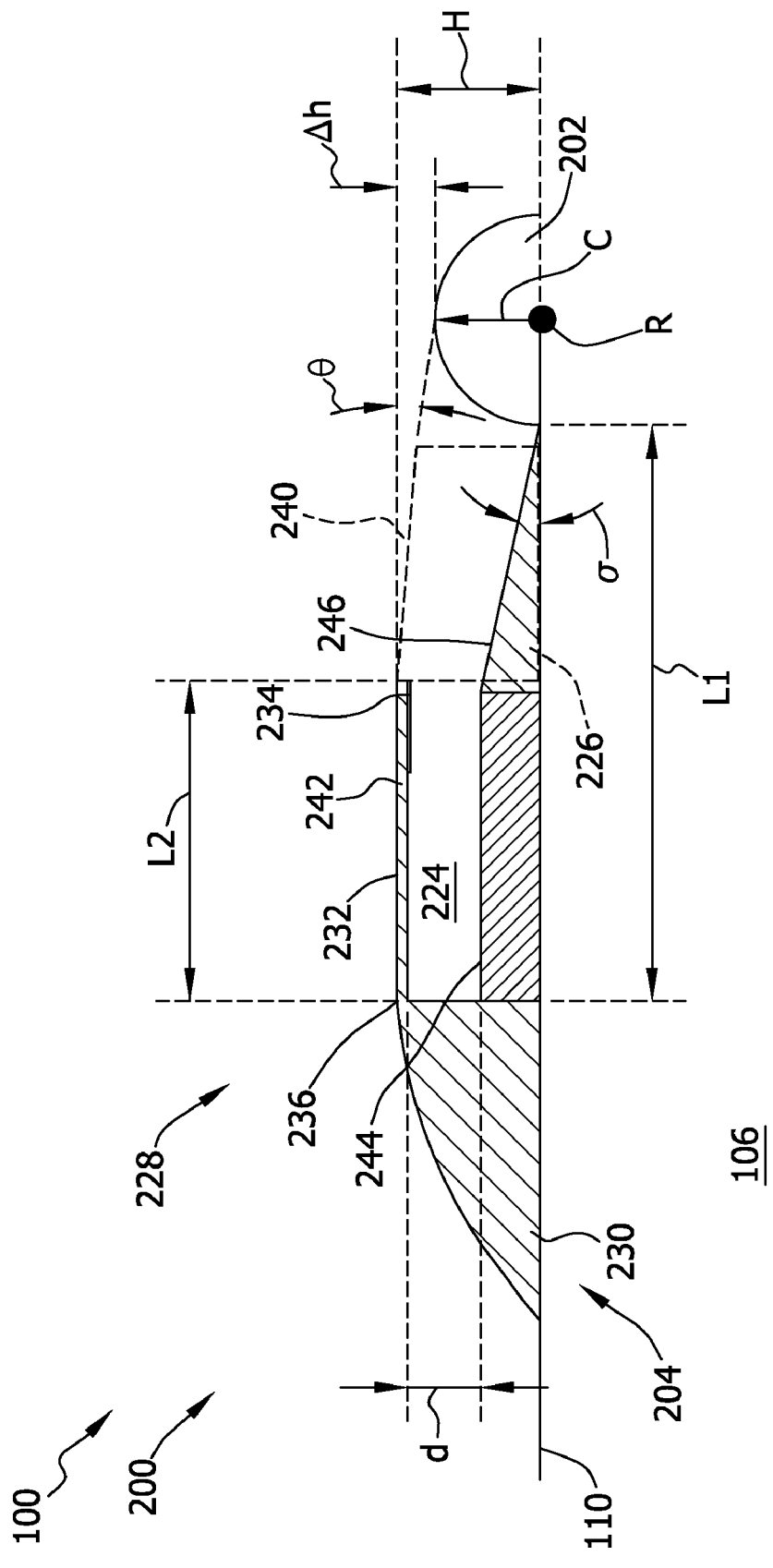
FIG. 6 is a cutaway side view of a portion of the turret and fairing assembly shown in FIG. 5 and taken along line A-A.

FIG. 3 is an overhead view of exemplary turret and fairing assembly 200 that may be used with aircraft 100. FIG. 4 is a side view of aft fairing section 204 that may be used with turret and fairing assembly 200. FIG. 5 is a fore-to-aft view of a portion of turret and fairing assembly 200. FIG. 6 is a cutaway side view of a portion of turret and fairing assembly 200 taken along line A-A. FIGS. 3, 4, 5, and 6 illustrate assembly 200 with a "lip" configuration wherein R is a radial dimension of spherical turret section 202 and H is a height of aft fairing section 204 as measured from the outermost portion of the aft fairing section 204 to a region substantially flush with aircraft fuselage 110.

In the exemplary embodiment, aft fairing section 204 includes a tapered fairing portion 226 positioned adjacent to and just aft of turret section 202. Tapered fairing portion 226 facilitates shifting a shock region aft of turret section 202 in transonic flight. Aft fairing section 204 also includes a fairing lip portion 228 coupled to and positioned adjacent to and aft of portion 226. Aft fairing section 204 further includes an aerodynamic aftmost fairing portion 230 coupled to and positioned adjacent to and aft of portion 228. Portions 226, 228, and 230 are coupled to aircraft fuselage 110.

Also, in the exemplary embodiment, fairing lip portion 228 includes a radially outermost, or outer surface 232, wherein outer surface 232 includes a forward, or leading end 234 and an aft end 236. Outer surface 232 extends between leading end 234 and aft end 236 substantially parallel to aircraft fuselage 110 and spaced a height H away from aircraft 100.

Further, in the exemplary embodiment, turret section 202 includes a radially outermost, or outer surface 238 having a substantially spherical shape with a predetermined radius R, wherein turret radius R extends radially outward from a center C of turret section 202 to outer surface 238 of turret section 202. Center C of turret section 202 is at least partially defined by a bifurcation of turret section 202 by aircraft fuselage 110.

Moreover, in the exemplary embodiment, tapered fairing portion 226 includes an outer surface 240 that has an expanding fore-to-aft frusto-conical configuration that defines a substantially symmetrical and constant linear taper having a predetermined fairing taper angle θ with respect to at least a portion of aircraft fuselage 110. Tapered fairing portion outer surface 240 also cooperates with at least a portion of turret section outer surface 238 to define a Δh dimension that is representative of a difference between H and R, both as described above. A value for the Δh dimension may be either positive or negative.

Fairing lip portion outer surface 232 cooperates with at least a portion of turret section outer surface 238 to define a Δh dimension that is representative of a difference between H and R, both as described above. More specifically, fairing lip portion 228 defines outer surface 232 extending a first distance H from a portion of aircraft 100 through the elevation plane (shown in FIG. 1B). Also, specifically, turret section 202 defines outer surface 238 extending a second distance R from a portion of aircraft 100 through the elevation plane, wherein a difference value Δh between first distance H and second distance R is predetermined. A value for the Δh dimension may be either positive or negative.

Also, in the exemplary embodiment, portion 228 defines a lip 242 between surface leading end 234 and surface aft end 236, wherein lip 242 includes at least a portion of outer surface 232. Therefore, in the exemplary embodiment, surface leading end 234 is also a leading edge of lip 242 and surface aft end 236 is also an aftmost end of lip 242. Further, lip 242 at least partially defines cavity 224. More specifically, portion 228 may include an unramped, or cavity floor surface 244 that is substantially parallel to at least a portion of aircraft fuselage 110 and at least a portion of outer surface 232 of fairing lip portion 228. Also, specifically, tapered fairing portion 226 may include a ramped floor surface 246 that is coupled to cavity floor surface 244.

Further, in the exemplary embodiment, cavity floor surface 244 and lip 242 define a distance d that is a distance between cavity floor surface 244 and lip 242. Ramped floor surface 246 and at least a portion of aircraft fuselage 110 define a ramp inclination angle σ.

Referring solely to FIG. 6, a first distance L1 is defined between the aftmost portion of cavity 224 that is at least partially defined by surface aft end 236 and an aftmost portion of spherical turret section 202. Moreover a second distance L2 is defined between the aftmost portion of cavity 224 and a forwardmost portion of lip 242 that is at least partially defined by surface leading end 234. L1 and L2 are related by:

$$L1 = K + L2 \tag{1}$$

wherein K is a predetermined constant that is selected to define the difference between L1 and L2.

Figure 7:
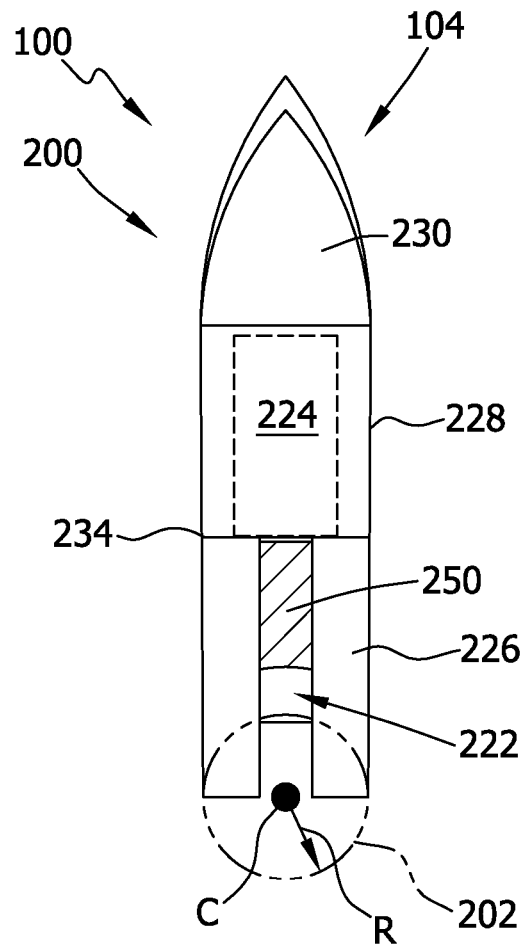
FIG. 7 is an overhead view of the turret and fairing assembly shown in FIGS. 5 and 6.
Figure 8:
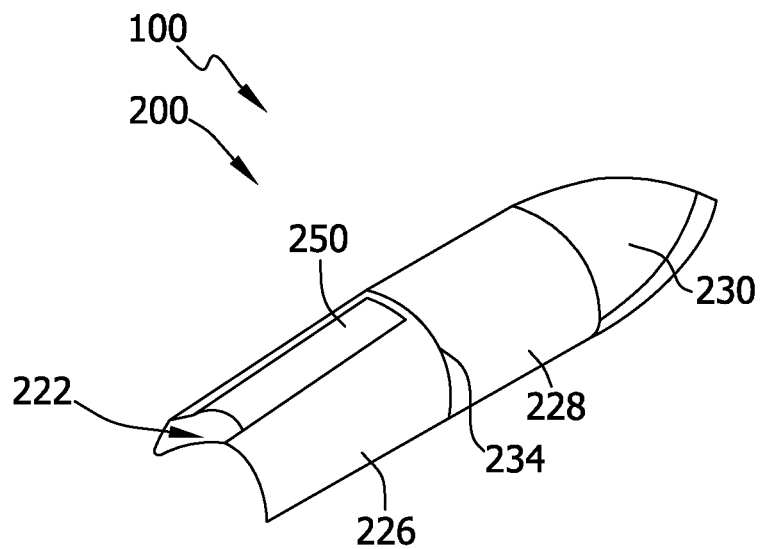
FIG. 8 is a perspective view of the turret and fairing assembly shown in FIG. 7.

FIG. 7 is an overhead view of turret and fairing assembly 200. FIG. 8 is a perspective view of turret and fairing assembly 200. FIGS. 7 and 8 illustrate a particular positioning of assembly 200 on aircraft 100, and assembly 200 may be positioned on any portion of aircraft 100 wherein operation of assembly 200 as described within is enabled. Tapered fairing portion 226 includes a moveable cover 250 that is moveable from a closed position to an open position, wherein cutout 222 is at least partially exposed when cover 250 is in the open position. Any mechanism that enables operation of cover 250 as described herein is used. FIG. 7 illustrates cover 250 in the fully open position. FIG. 8 illustrates cover 250 in the fully closed position. When in the closed position, directed energy beam 220 is limited to transmission from directed energy device 203 (both shown in FIGS. 1, 2, and 3) in an elevation range between approximately 0 degrees and approximately 85 degrees along elevation angle 212. When in the open position, directed energy beam 220 is permitted to transmit from directed energy device 203 in an elevation range that is greater than approximately 85 degrees along elevation angle 212.

Therefore, in the exemplary embodiment, turret and fairing assembly 200, at least partially facilitated via spherical turret section 202 and cutout 222, is configured to provide a field of regard (FOR) for directed energy device 203 that includes a range of elevation angles of at least approximately 0° to approximately 160° and a range of azimuthal values of at least approximately −80° to approximately 80°. Alternatively, turret and fairing assembly 200 is configured for any range of elevation and azimuthal values that facilitates operation of directed energy device 203.

The two primary aero-optic aberration generating phenomena that limit system effectiveness, and the lethal field of regard, in particular, are the separated turbulent shear layer (discussed further below) and the shock waves that occur in transonic flow. Those skilled in the art will appreciate the considerable effort put into understanding the optical aberrations due to laser beam propagation through fully-subsonic flows, first through fundamental flow fields and then laser beam propagation for more complicated geometries comprised of several of these flow fields combined. Depending on the azimuth and elevation angles for the laser beam propagation, the laser projects through the more fundamental flows comprising the overall flow either singly or in combination with another field. Because the systems and methods described herein include using an aerodynamic aft fairing that is larger than the turret in cross section, the flow over the turret at transonic speeds is still subsonic.

Those skilled in the art may note that the large cutout required to achieve nearly hemispherical FOR can be minimized by mounting the entire turret outside the aircraft structure. While this largely eliminates the cutout, there is a very large increase in aerodynamic drag that results because of the greatly increased turret exposure and the fairings around its base and aft of the turret. The aircraft's range and altitude performance is thus reduced accordingly.

Figure 9:
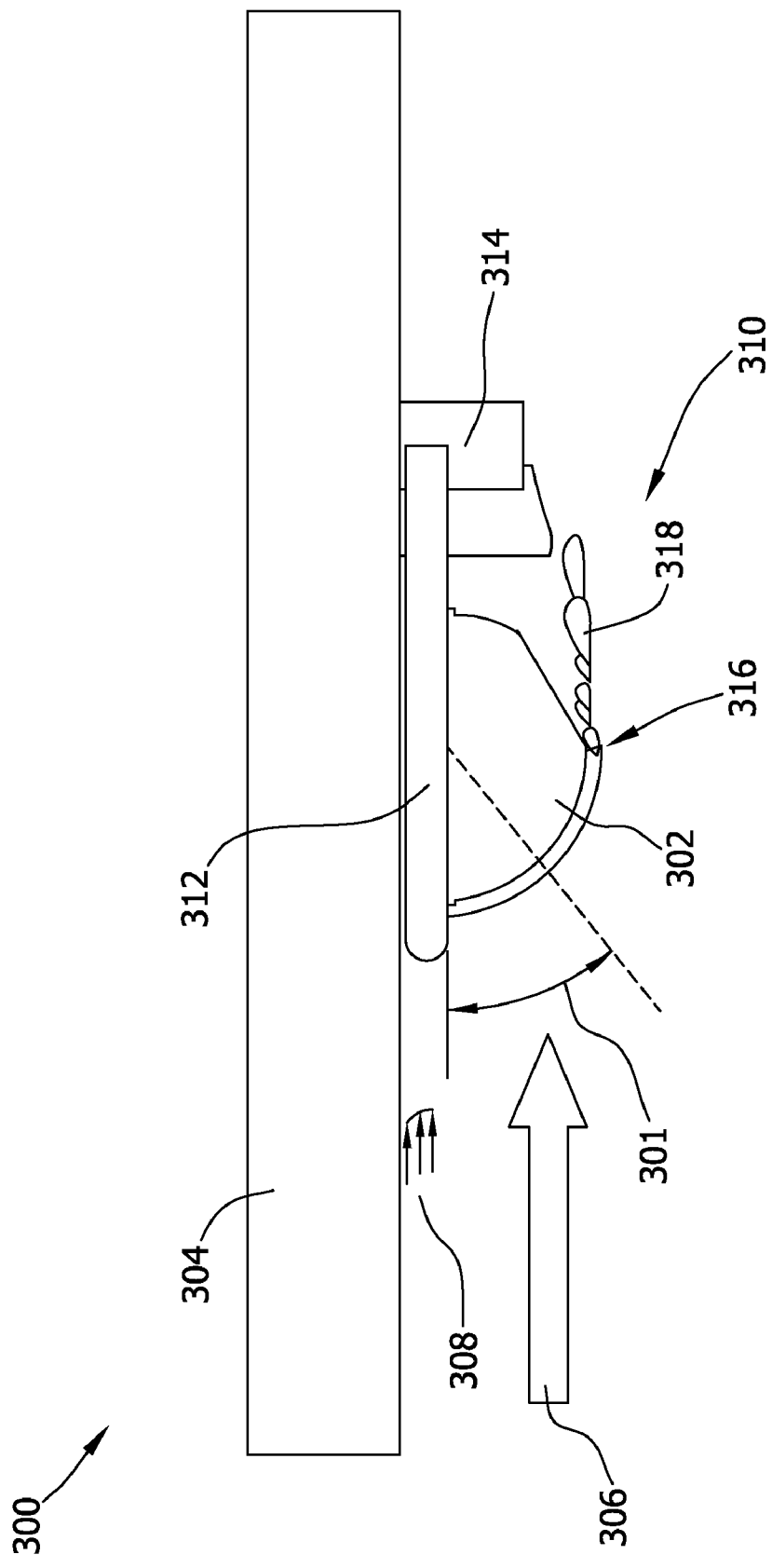
FIG. 9 is a side view of an airflow field about an embodiment of a turret mounted on an underside of an aircraft.
Figure 10:
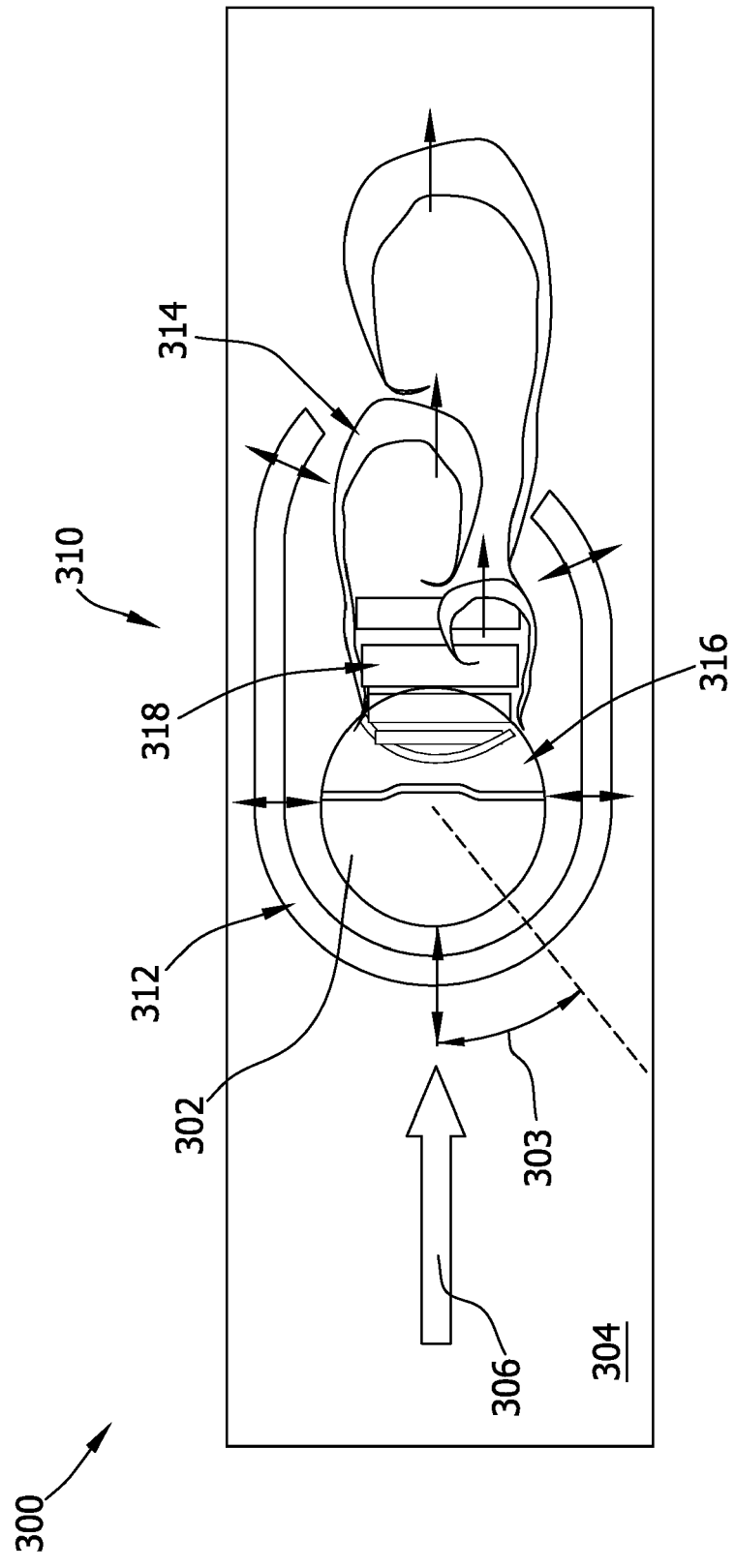
FIG. 10 is a bottom view of the airflow field about the turret shown in FIG. 9.

FIG. 9 is a side view of an airflow field 300 about an embodiment of a typical turret 302 mounted on an underside of a fuselage 304 of an aircraft (not shown in FIG. 9). An elevation angle 301 is illustrated for perspective. FIG. 10 is a bottom view of airflow field 300 about typical turret 302. An azimuth angle 303 is illustrated for perspective. Specifically, FIGS. 9 and 10 illustrate a typical fully-subsonic flow field 300 around turret 302. A freestream flow 306 of air includes an incoming boundary layer 308 that is in the near vicinity of fuselage 304. Flow field 300 is dominated by a separated shear layer 310 aft of turret 302 as well as a strong "necklace" vortex 312 around a base (not shown) of turret 302. Necklace vortex 312 and at least a portion of a remaining bulk of freestream flow 306 at least partially form a wake turbulence 314 aft of turret 302. Separated shear layer 310 includes a separation region 316, wherein a plurality of shear layer structures 318 are formed about and aft of turret 302. Shear layer 310 includes a plurality of air pressure and airflow instabilities primarily formed from a plurality of air vortices (not shown in FIGS. 9 and 10) shed at various frequencies aft of turret 302.

Due to its position relative to a laser beam propagation path (not shown in FIGS. 9 and 10), shear layer 310 is the main source of optical aberrations for back-looking angles. Various active and passive controls have been investigated as a means of modifying shear layer 310 to yield a more favorable optical environment. At least some of these known controls aim to attenuate or modify the large-scale vortices in shear layer 310. However, these known controls have produced limited results because the controls often require a large control input and/or an unrealistic operating frequency, especially at higher air speeds. Another approach has been to try to reattach boundary layer 308 over the optical window (not shown). This approach may work for elevation angles near 90°, but produces limited results at larger elevation angles due to the rather large adverse pressure gradient encountered. The methods and systems described herein have demonstrated success in improving the beam propagation for look-back angles up to at least 123° from the direction of freestream flow 306. Furthermore, devices used to modify shear layer 310 may also introduce disturbances with their own optical aberrations. Finally, the devices often need to be placed at a favorable position relative to separation region 316, which can potentially be problematic since the position of the optical window is not fixed. The methods and systems described herein are directed at improving beam propagation in aft directions.

Figure 11:
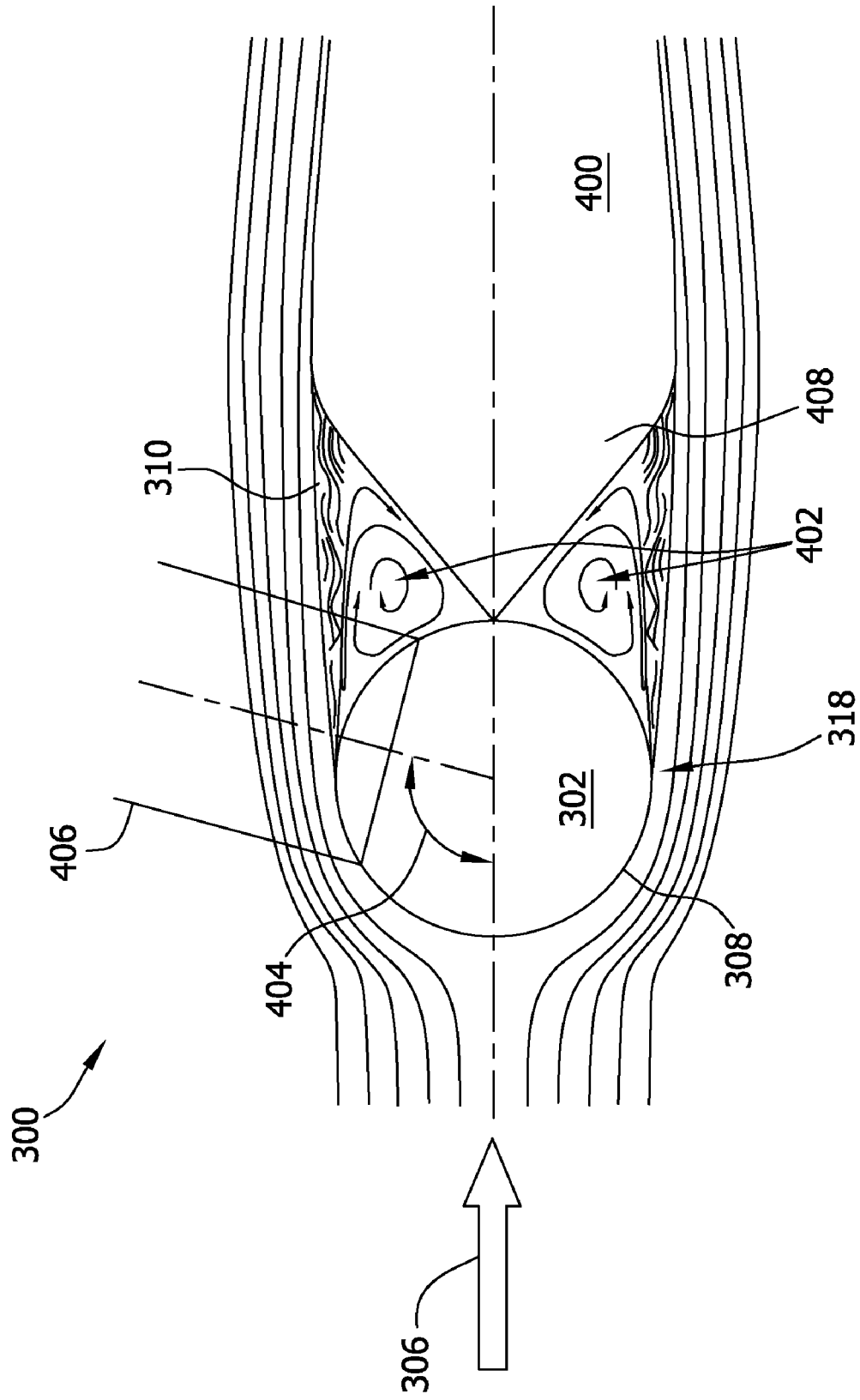
FIG. 11 is a bottom view of the airflow field about the turret shown in FIGS. 9 and 10 and channeled about a fairing.

FIG. 11 is a bottom view of airflow field 300 about typical turret 302 and channeled about an aerodynamic fairing 400. Aerodynamic fairing 400 is positioned aft of turret 302. Fairing 400 improves aerodynamic airflow immediately aft of turret 302 so as to reduce both wake turbulence 402 (as contrasted to wake turbulence 314 as shown in FIGS. 9 and 10) and total aerodynamic drag of turret 302. As discussed above, because of the desire for a larger aft look-back angle 404 of a directed energy beam 406, a forward portion 408 of fairing 400 is substantially acute. However, this results in flow separation from turret 302, with recirculated air (not shown) adjacent to shear layer 310 thereby reducing an efficiency of fairing 400 and forming of optical aberrations within wake turbulence 402 and shear layer 310. For look-back angles greater than 90°, the optical aberrations associated with turbulent shear layer 310 and wake turbulence 402 degrade the associated Strehl ratio. The Strehl ratio is an indicator of how closely the focus of an optical path conforms to ideal parameters at a remote point. A perfect optical wavefront has, by definition, a Strehl ratio of 1.0. Depending on specific requirements, Strehl ratios below 0.95 to 0.90 are undesirable. With respect to at least some of the known turrets of the kind now in use, Strehl ratios as low as 0.4, or lower, may be experienced for look-back angles greater than 120 degrees, resulting in essentially unusable far-field imagery.

Therefore, the inherent limitations and disadvantages of at least some of the known turrets and fairings now in use may include: (1) an increase in structural weight and degradation of structural integrity; (2) an increase in aerodynamic drag; and (3) a limitation to the maximum optically undegraded look-back angle that can be obtained.

Figure 12:
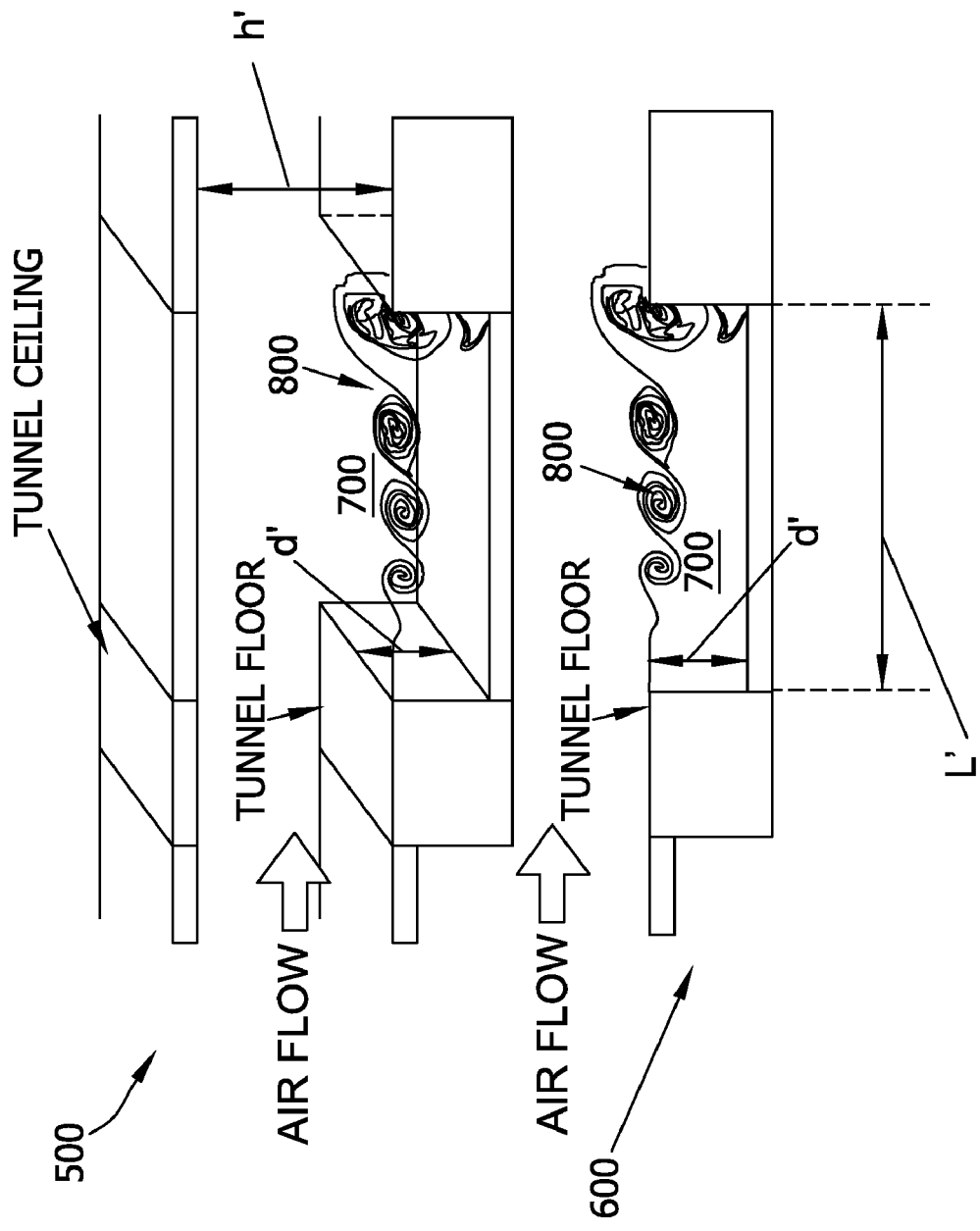
FIG. 12 is a perspective view and a side view of a tunnel geometry illustrating a strong vortical structures.

FIG. 12 is a perspective view 500 and a side view 600 of a tunnel 700 geometry illustrating strong vortical structures of acoustic energy 800. In the exemplary embodiment, initial development of optical propagation improvement systems and methods disclosed herein was performed in laboratory experiments of laser propagation through a shear layer spanning an open face of a two-dimensional cavity in the wall of a wind tunnel.

However, theoretical aeroacoustic analysis showed that trapping of acoustic energy can occur in certain frequency bands for the cavity in wind tunnel 700 wall geometry illustrated in FIG. 12. This phenomenon occurs over a range of subsonic Mach numbers (M<0.75 in the experiments discussed above). The presence of a nearly-trapped mode results in acoustic amplitudes that greatly exceed what can be expected in free flight.

The nearly-trapped mode phenomenon occurs in duct geometries that involve changes in the cross-sectional area, such as for cavity resonance experiments using a cavity-in-wall geometry (referring to FIG. 12). The higher-order cross-stream modes (or eigenfunctions) play an important role in this phenomenon. Each higher-order mode propagates only for frequencies above its critical frequency. At frequencies below its critical frequency, the mode is cut-off; it decays exponentially with distance along the duct, and transmits no acoustic energy. For the cavity-in-wall geometry, there are two types of cross-stream modes. First, there are "tunnel modes" in the tunnel regions upstream and downstream of the cavity. Second, there are "cavity-tunnel modes" in the portion of the tunnel containing the cavity. At modest subsonic Mach numbers, the critical frequency for a higher-order cavity-tunnel mode is smaller than the critical frequency for the corresponding tunnel mode. The region between these two critical frequencies defines the frequency window for the $n^{th}$ higher mode.

When a response is excited in the cavity in the frequency window for the $n^{th}$ higher mode, most of the acoustic energy in the cavity-tunnel mode is trapped in the cavity region, wherein only a small amount of acoustic energy escapes through scattering into lower-order propagating tunnel modes. Since the acoustic radiation is hampered by the $n^{th}$ tunnel mode being cut-off, the energy in the cavity region builds up and the response amplitude greatly exceeds that which could be expected from a similar geometric feature in an external flow environment.

The theoretical analysis for the strong vortical structure, or the "nearly-trapped mode" phenomenon facilitates predicting the frequency windows where nearly-trapped modes occur, as a function of Mach number and cavity/tunnel geometry. In all cases we use the two-dimensional modes (i.e., spanwise mode order=0). The critical frequencies for tunnel modes (1,0), (2,0) and (3,0) were computed assuming uniform flow in the tunnel. The critical frequencies for the cavity-tunnel modes were calculated with the assumptions that a vortex sheet spans the top of the cavity, that there was no flow within the cavity, and that the flow above the vortex sheet was uniform (see FIG. 12). These experiments used various dimensions for the cavity depth (d'), the tunnel height (h'), and the cavity length (L'). Below, we summarize the strongest tones that were found in each case, and we compare the experimentally obtained frequencies with frequency predictions from two models. The first model is Rossiter's semi-empirical theory for cavity resonance frequencies. Rossiter's model is a simple representation for the feedback loop in the case of a cavity on an external surface (no confining wind-tunnel walls), which has proven useful for predicting cavity resonance frequencies. The second model is the new theory for the frequency windows for nearly-trapped modes for the cavity in wind-tunnel wall geometry.

Figure 13:
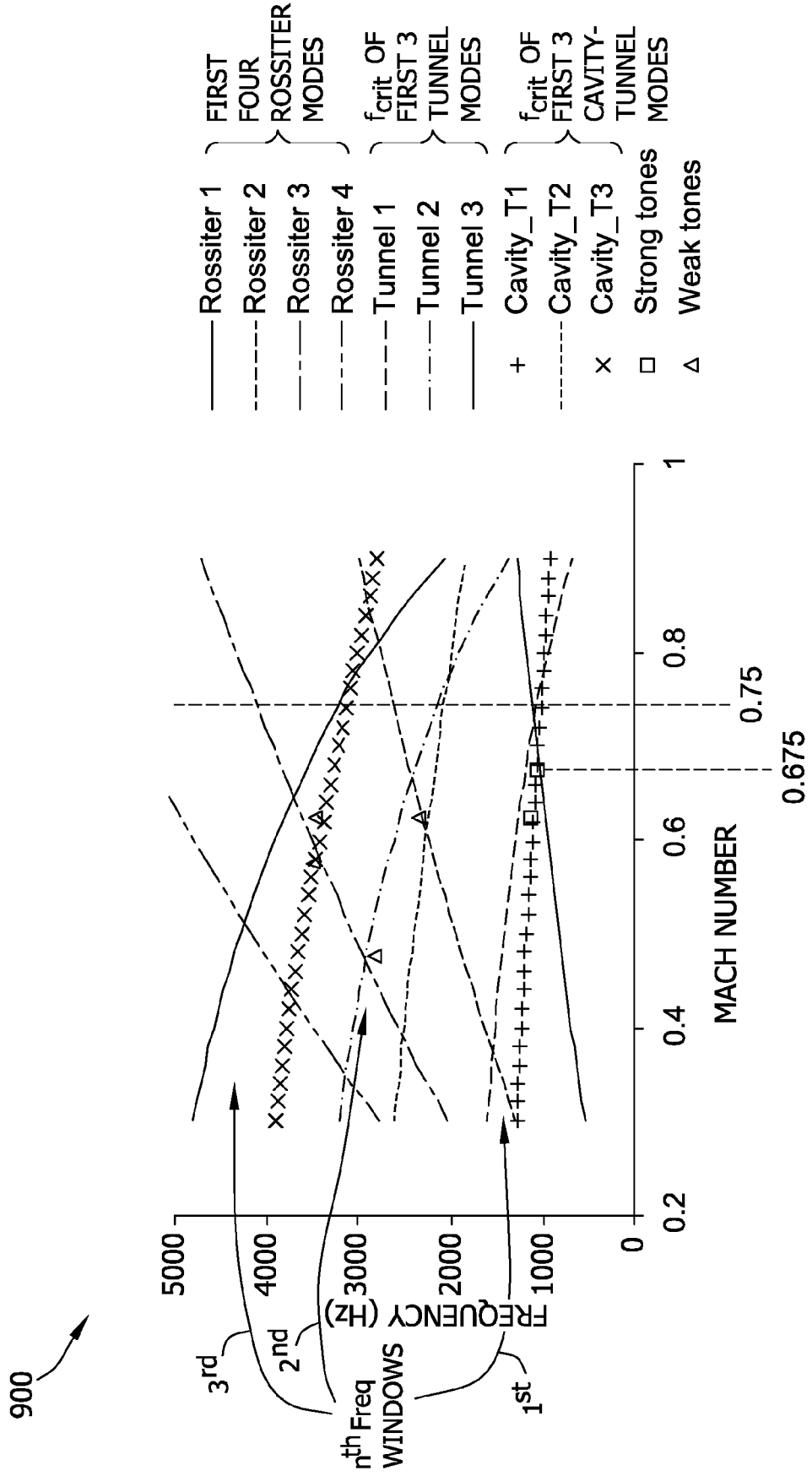
FIG. 13 is a graphical view of a first cavity in tunnel wall analysis.

FIG. 13 is a graphical view 900 of a first cavity in which experiments were run and predictions were made. Frequency is represented on the y-axis in increments of 1000 Hertz (Hz) and Mach number is represented on the x-axis in increments of 0.2. The solid curves with positive slopes are the first 4 Rossiter modes. The 3 solid curves with negative slope are the critical frequencies for the first 3 tunnel modes (recall that these are two-dimensional modes—no spanwise variation). The curves defined by pluses, dashes, and "X's" are the critical frequencies of the first three cavity-tunnel modes. The frequency region between the critical frequencies of the $n^{th}$ "cavity-tunnel mode" and the $n^{th}$ "tunnel mode" is referred to as the "$n^{th}$ frequency window". These windows exist for Mach numbers less than 0.75 when the cavity depth is 25% of the tunnel height. As discussed above, when the experimental peak response frequency is in these regions, it corresponds to a "nearly-trapped mode". Essentially, the cavity shear layer disturbance excites the propagating (and nearly resonant) cavity-tunnel mode (because the frequency is higher than the critical frequency of the $n^{th}$ cavity-tunnel mode), but very little energy propagates away upstream or downstream of the cavity (because the frequency is below the critical frequency of the $n^{th}$ tunnel mode frequency). Note that for the M=0.625 case there are 3 nearly-trapped mode responses that fall near to the first, second, and third Rossiter modes. All the Mach number cases examined for the first case cavity result in nearly-trapped mode responses.

Figure 14:
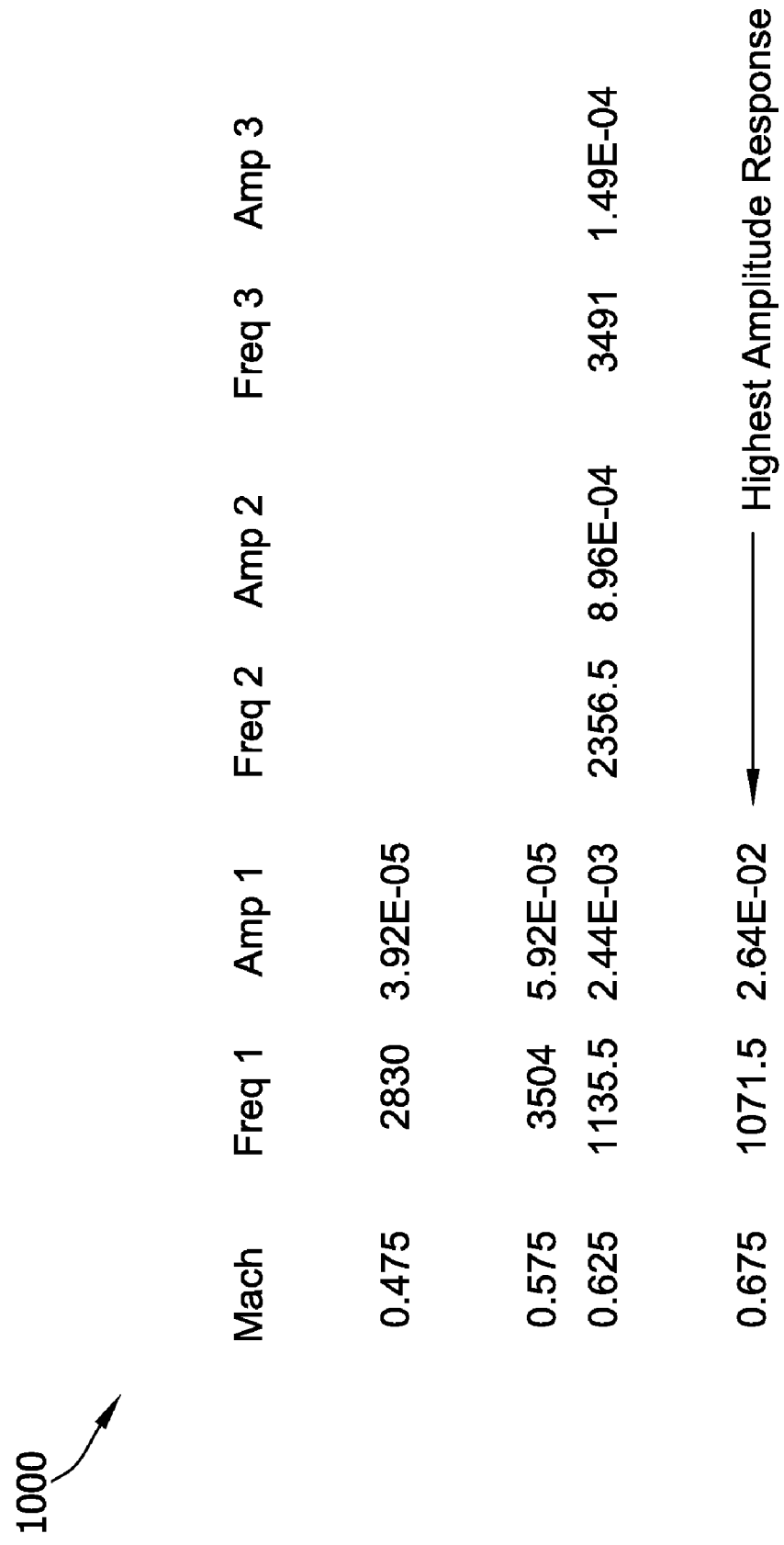
FIG. 14 is a tabular view of frequency and amplitude data associated with the first cavity in tunnel wall analysis as shown in FIG. 11.

FIG. 14 is a tabular view 1000 of frequency and amplitude data associated with the first cavity 900 (shown in FIG. 13). The amplitudes of the dominant frequency responses for the first cavity vary by almost three orders of magnitude. FIG. 14 illustrates details of the frequency and amplitude pairs for each Mach number. The relatively large amplitude of the dominant modes is due to the presence of nearly-trapped modes. It is expected that a free flight cavity will exhibit very different behavior, because there is no analog for the tunnel walls to interact with the cavity. Thus, cavities in free flight will be free of nearly-trapped modes.

The highest amplitudes for these nearly-trapped mode results for the first cavity are for the two highest Mach number cases. We believe that the disturbance levels saturate at finite amplitude primarily due to the Kelvin-Helmholtz instability growing the shear layer thickness to the point that the dominant frequency disturbance can no longer extract energy from the mean shear layer profile. In the range of Mach numbers considered here, the shear layer instability saturation levels scale closely with the velocity difference across the shear layer, and the velocity difference across the shear layer scales with Mach number. Therefore, it is not surprising that the highest Mach number cases have the highest amplitude.

Two other factors also contribute to the nearly-trapped mode at the highest Mach number having the highest amplitude for the first cavity. First, the lower Rossiter modes often have higher energy levels than higher Rossiter modes. At the two highest Mach numbers of the first cavity, the response is at a frequency very close to the $1^{st}$ Rossiter mode. The response at M=0.675 is probably enhanced by the close match seen with the frequency of the $1^{st}$ Rossiter mode. Second, the energy trapping is more complete when the response lies in the $1^{st}$ frequency window, since only the plane wave mode is available to propagate energy away in the tunnel for this case. In contrast, other tones seen in FIG. 13 lie in the $2^{nd}$ and $3^{rd}$ frequency windows, where additional modes are available to propagate energy away in the tunnel.

Note that the above discussion depends on all the dominant resonant responses being nearly-trapped modes (as was the case for the first cavity). If a mix of nearly-trapped and non-trapped modes is present, then these arguments on the scaling can not be expected to hold (as discussed below).

Figure 15:
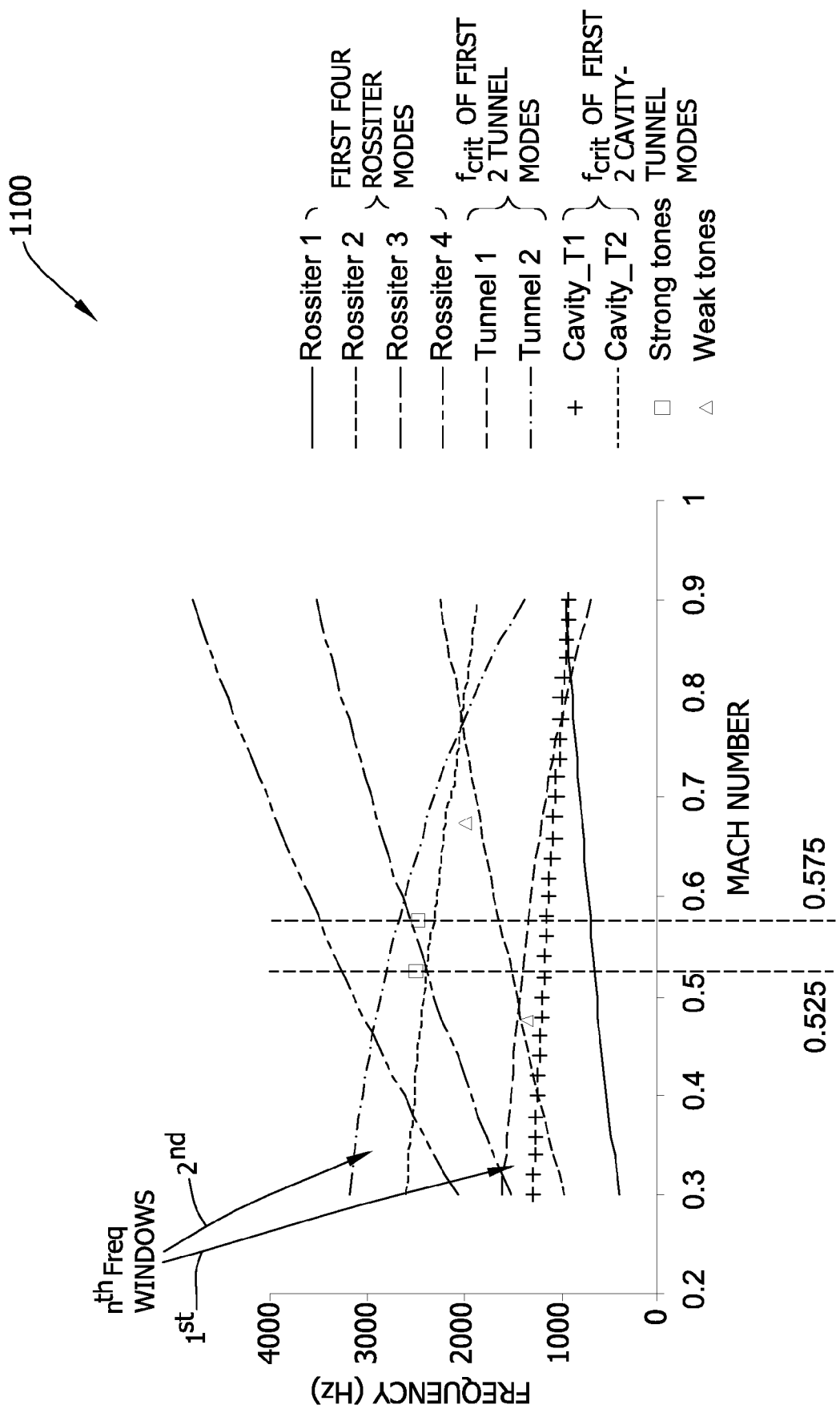
FIG. 15 is a graphical view of a second cavity in tunnel wall analysis.

FIG. 15 is a graphical view of results for a second cavity 1100. Frequency is represented on the y-axis in increments of 1000 Hertz (Hz) and Mach number is represented on the x-axis in increments of 0.1. FIG. 16 is a tabular view 1200 of frequency and amplitude data associated with second cavity 1100 (shown in FIG. 15). The dominant frequencies at the lowest three Mach numbers all correspond to nearly-trapped modes.

Unlike with the first cavity, the highest amplitude response for the second cavity is not at the highest Mach number (M=0.675). However, it is important to note that the tone at the highest Mach number does not lie in a frequency window. Since the tone at M=0.675 is not in a frequency window, the energy supplied to the active cavity-tunnel mode can be easily radiated away from the cavity by the corresponding tunnel mode. Thus, this case ends up having the lowest amplitude. Hence, the M=0.675 case clearly illustrates the impact that the cavity/tunnel interactions can have.

The highest amplitudes for the second cavity occur at M=0.525 and 0.575, wherein these are nearly-trapped modes that lie in the 2nd frequency window. This emphasizes the importance of the nearly-trapped mode phenomenon. Regarding the difference in amplitude between the responses at M=0.525 and 0.575, little significance should be attached to the differences in amplitude for these two cases, since measurements have been made at only two points in the cavity.

Figure 17:
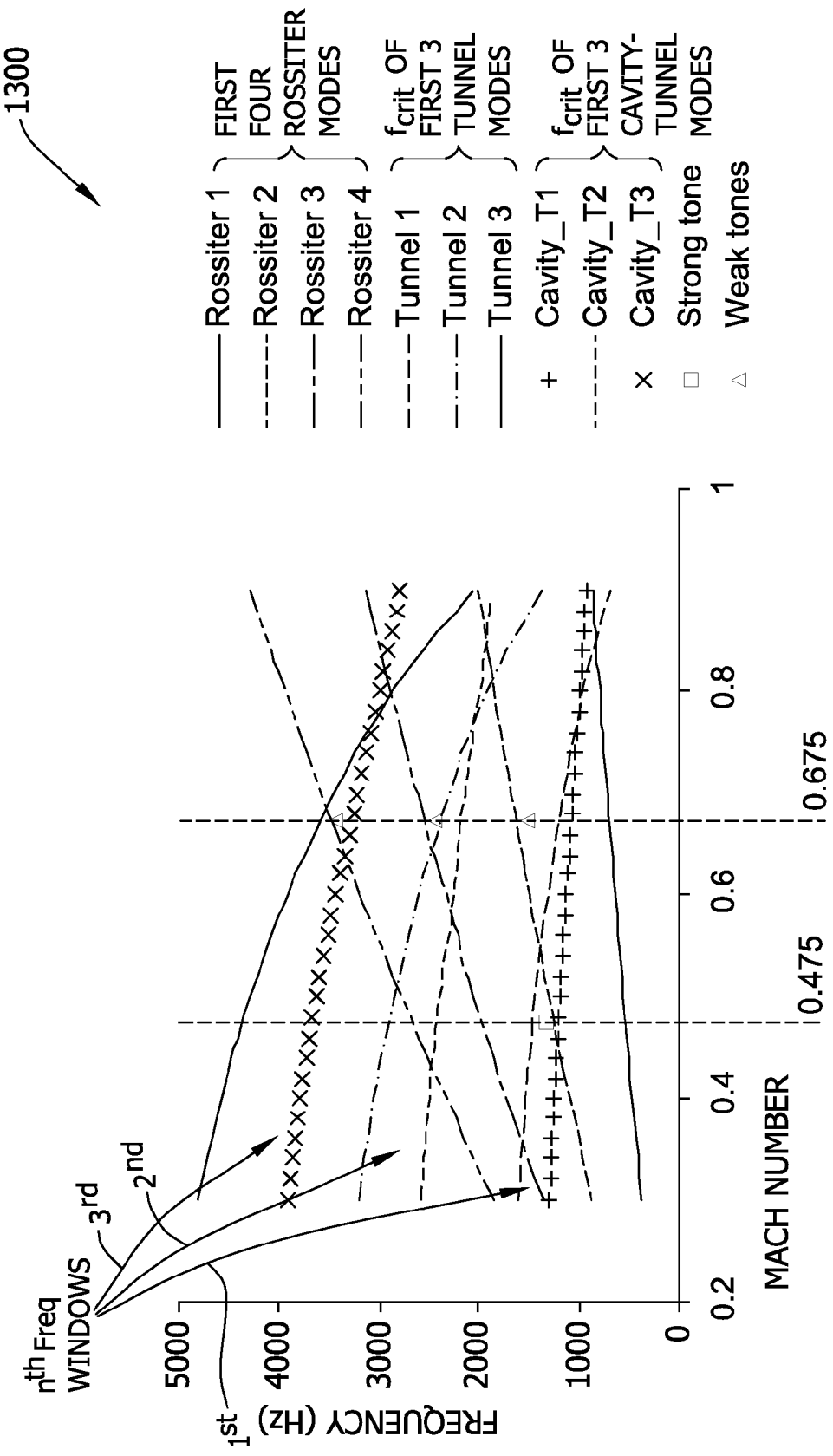
FIG. 17 is a graphical view of a third cavity in tunnel wall analysis.
Figure 18:
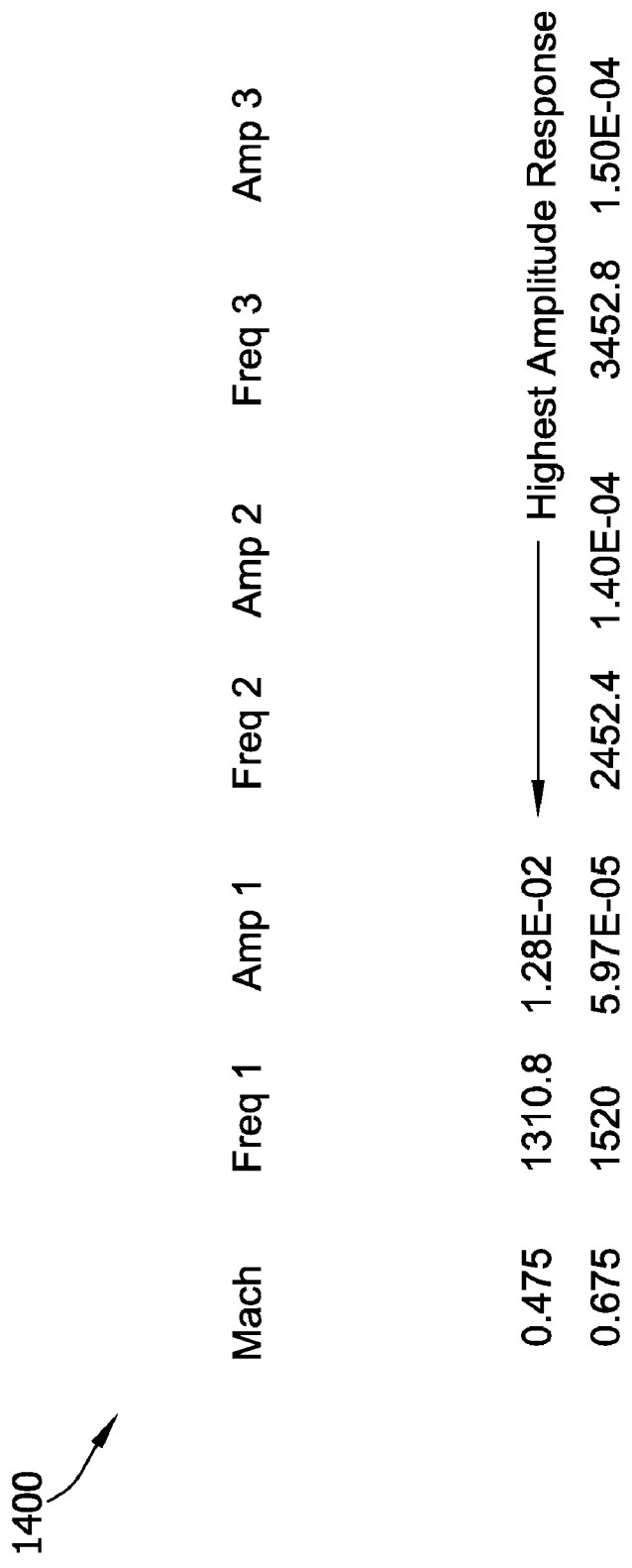
FIG. 18 is a tabular view of frequency and amplitude data associated with the third cavity in tunnel wall analysis as shown in FIG. 15.

FIG. 17 is a graphical view 1300 of results for a third cavity. Frequency is represented on the y-axis in increments of 1000 Hertz (Hz) and Mach number is represented on the x-axis in increments of 0.2. FIG. 18 is a tabular view 1400 of frequency and amplitude data associated with third cavity 1200 (shown in FIG. 17). In this configuration, the lowest Mach number (M=0.475) has the highest amplitude response. The amplitude is an order of magnitude higher than the corresponding tone at M=0.475 for the second cavity (shown in FIGS. 13 and 14). One possible explanation for this difference is that in the second cavity, the response is very close to the intersection of the $2^{nd}$ Rossiter mode frequency and the $1^{st}$ tunnel mode critical frequency. This may enable the second cavity to leak energy (at this frequency) faster than for the third cavity.

The results for the higher Mach number case (M=0.675) of the third cavity are especially interesting because this case had three spectral peaks, rather than the single peak observed in the other cases. The two lower frequency peaks are not in the frequency windows, and therefore are not nearly-trapped modes. Thus, the energy at these frequencies can propagate away from the cavity quite easily, leading to relatively small resonance amplitudes.

The one nearly-trapped mode that occurs for M=0.675 in the third cavity has the highest amplitude (for this Mach number and cavity), but the amplitude is only slightly higher than that seen in the second cavity at this Mach number (which was not a trapped mode response). In contrast, the tone for M=0.675 and the first cavity (shown in FIGS. 13 and 14), which was a trapped mode response, had an amplitude that was higher by two orders of magnitude. There are two factors that may explain the lower response level for the 3453 Hz tone at M=0.675 in the third cavity. First, the tone in the third cavity is excited by the $4^{th}$ Rossiter mode, while the tone in the first cavity is excited by the $1^{st}$ Rossiter mode. The higher Rossiter modes typically have less energy than the lower Rossiter modes. Second, the tone for the third cavity is in the $3^{rd}$ frequency window, while the tone for the first cavity is in the $1^{st}$ frequency window. For the $1^{st}$ frequency window, the only propagating mode available to transfer energy away from the cavity region is the plane wave mode in the tunnel. In contrast, for the third frequency window, there are three propagating modes available to transfer energy away from the cavity region, the plane wave mode and the $1^{st}$ and $2^{nd}$ tunnel modes. In general, higher amplitudes are expected when the response is in the lower frequency windows.

Analysis of Kulite data from cavities in a wind-tunnel wall has shown the importance of aeroacoustics mode interaction considerations. Tunnel modes, cavity-tunnel modes and experimental response data have been analyzed for multiple Mach numbers and L/D ratios. The "nearly-trapped mode" behavior that was identified by Kerschen has been found to significantly influence the results. Amplitudes of the spectral peaks are shown to vary by up to three orders of magnitude. The data examined here shows that the aeroacoustic behavior is consistent with Kerschen's conceptual model of the mode-trapping phenomenon. The enhancement of resonance amplitudes is particularly significant when the tone falls in the $1^{st}$ frequency window. The amplitude of the spectral peaks of a nearly-trapped mode can scale with Mach number, but the matching with generic Rossiter mode energy levels, and the proximity of the Mach number/peak frequency pair to the intersection of a Rossiter mode and tunnel critical frequency (as functions of Mach number), also appear to play a major role. Even if the response is a nearly-trapped mode, it appears that such opportunities for the increased radiation of energy can be a very important factor in determining which Mach number/frequency pair has the highest amplitude.

While the cavity in wind-tunnel wall geometry proved useful for developing aspects of the optical propagation improvement system, and methods as described herein, the presence of nearly-trapped modes implies that the results are not fully representative of the behavior that would be expected in flight conditions. Therefore we carried out further experiments, in which a small three-dimensional model was used in a wind tunnel. In order to avoid the nearly-trapped mode phenomenon, the cavity in the aft fairing was not recessed into the wind-tunnel wall. We have found that the use of a cover (or downstream lip) leads to aeroacoustic resonances that are sufficiently strong to permit feed-forward adaptive-optic correction for shear layer aberrations.

Figure 19A:
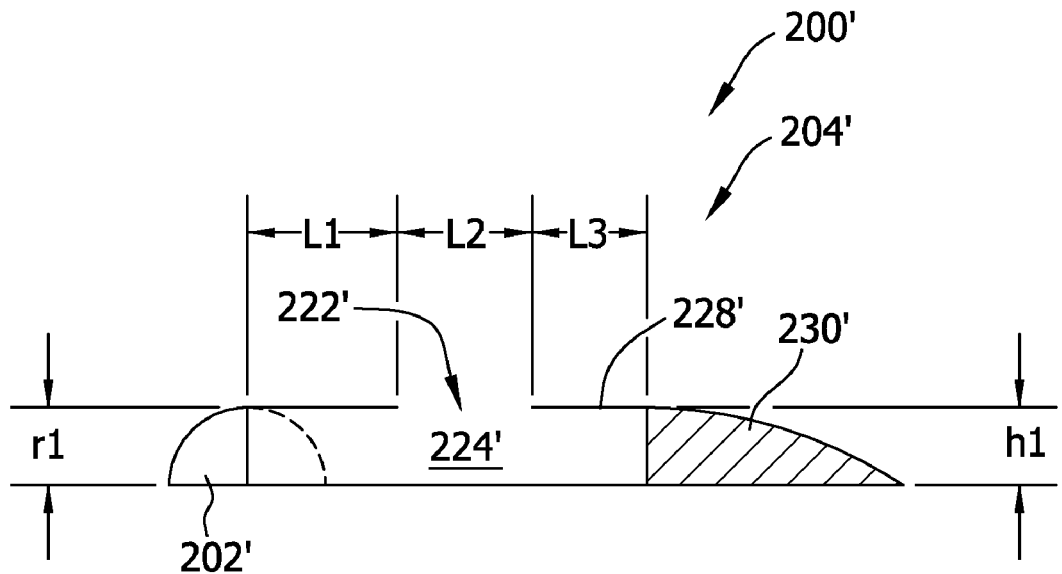
FIG. 19A is a cutaway side view of an alternative embodiment of a turret and fairing assembly that may be used with the aircraft shown in FIGS. 1A, 1B, and 2.

FIG. 19A is a cutaway side view of an alternative embodiment of a turret and fairing assembly 200' that may be used with aircraft 100 (shown in FIGS. 1A, 1B, and 2). Assembly 200' is substantially configured for subsonic flight with little to no shock wave generation. Assembly 200' includes an alternative turret section 202' that has a radius r1. Assembly 200' also includes an alternative aft fairing section 204' that includes an alternative cutout 222', an alternative cavity 224', an alternative fairing lip portion 228', and an alternative aftmost fairing portion 230', that has a height h1 that is substantially similar in value to radius r1.

Figure 19B:
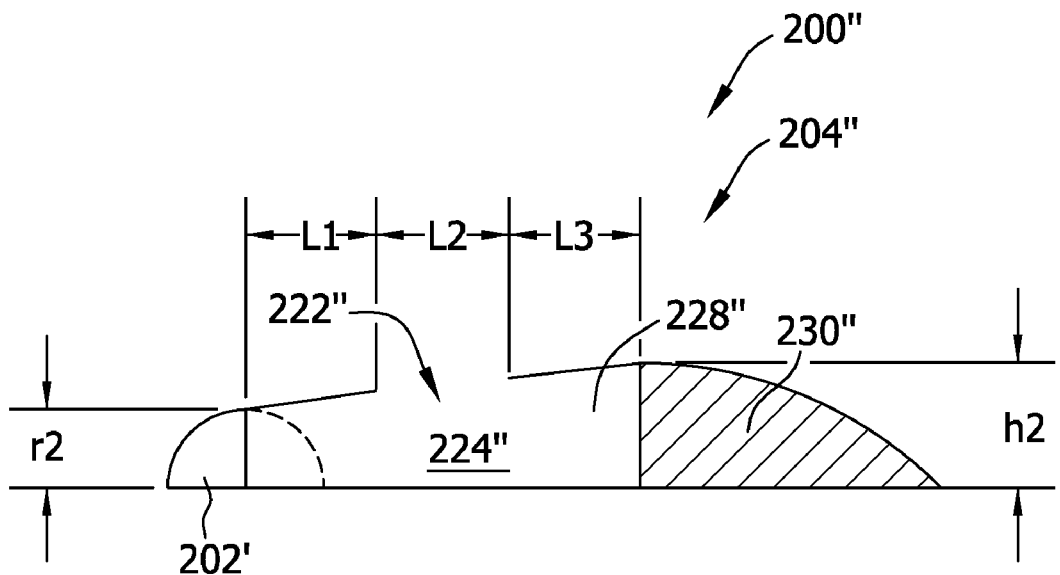
FIG. 19B is a cutaway side view of another alternative embodiment of a turret and fairing assembly that may be used with the aircraft shown in FIGS. 1A, 1B, and 2.

FIG. 19B is a cutaway side view of another alternative embodiment of a turret and fairing assembly 200" that may be used with aircraft 100 (shown in FIGS. 1A, 1B, and 2). Assembly 200" is substantially configured for transonic flight with shock wave generation, while also being suited for subsonic flight. Assembly 200" includes an alternative turret section 202" that has a radius r2. Assembly 200" also includes an alternative aft fairing section 204" that includes an alternative cutout 222", an alternative cavity 224", an alternative fairing lip portion 228", and an alternative aftmost fairing portion 230", that has a height h2 that is greater than radius r2. Also, radius r2 is greater than or equal to radius r1 (shown in FIG. 19A), and values for radius r2 are multiples of a constant times radius r1.

Figure 20A:
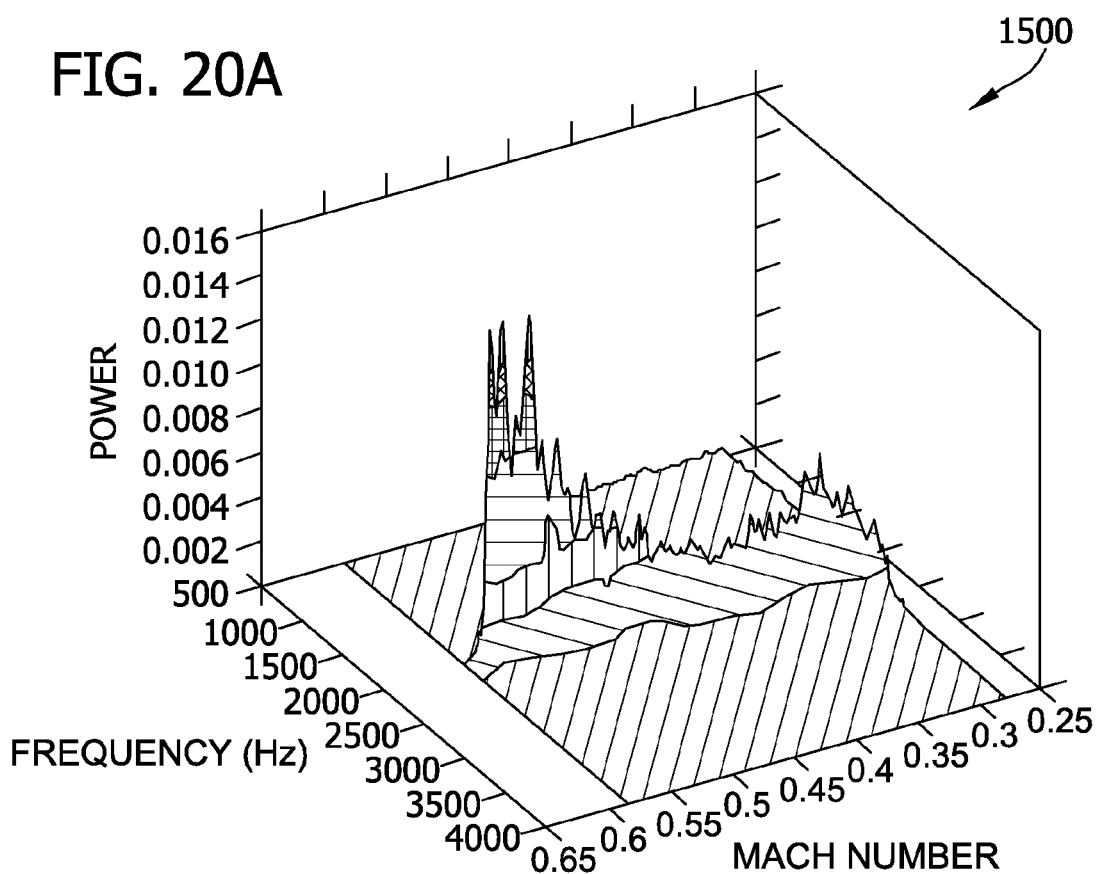
FIG. 20A is a three-dimensional graphical view of power versus frequency versus Mach number for a turret and fairing assembly having a first tapered raised lip configuration.
Figure 20B:
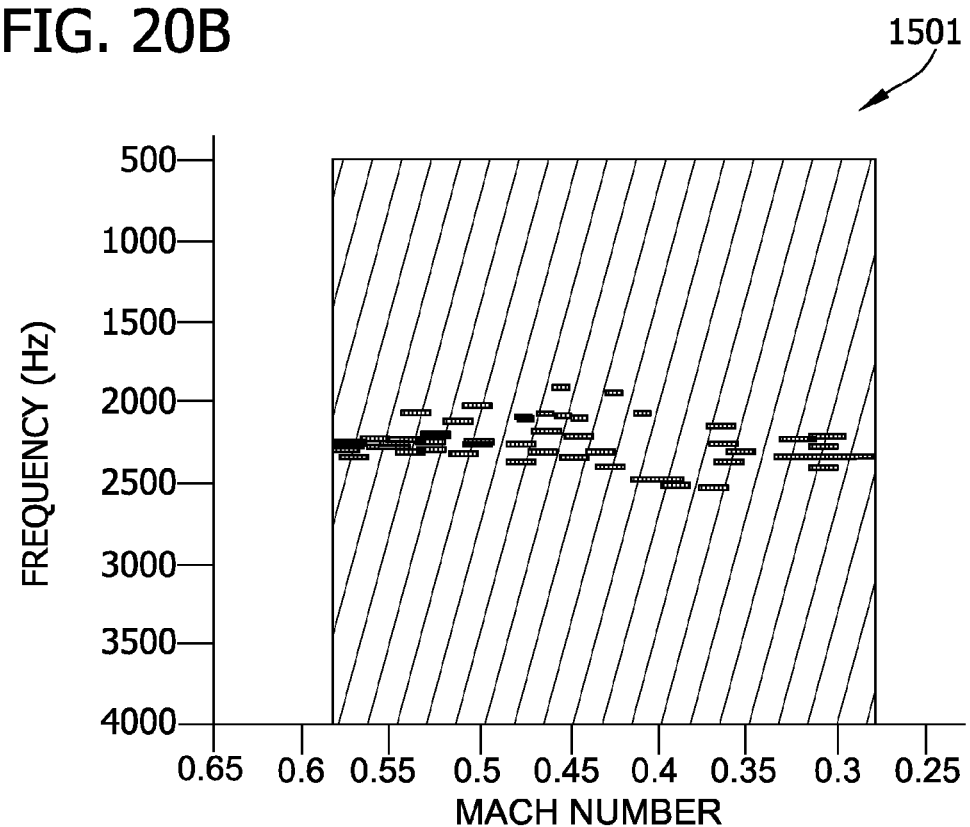
FIG. 20B is a two-dimensional graphical view of power versus frequency versus Mach number for a turret and fairing assembly having a first tapered raised lip configuration.

FIG. 20A is a three-dimensional graphical view 1500 of power versus frequency versus Mach number (M) for a turret and fairing assembly (not shown) having a first tapered raised lip configuration (not shown). FIG. 20B is a two-dimensional graphical view 1501 of power versus frequency versus Mach (M) number for a turret and fairing assembly (not shown) having a first tapered raised lip configuration (not shown). FIGS. 20A and 20B are associated with the configurations shown in FIGS. 19A and 19B.

In three-dimensional view 1500, frequency is represented on the y-axis in increments of 500 Hertz (Hz), Mach number is represented on the x-axis in increments of 0.05, and amplitude, or power is represented on the z-axis in increments of 0.002. In two-dimensional view 1501, frequency is represented on the y-axis in increments of 500 Hertz (Hz) and Mach number is represented on the x-axis in increments of 0.05. In this embodiment, the first configuration includes a short-length covered cavity, in a wind tunnel with an acoustically treated top wall section (neither shown). FIGS. 20A and 20B illustrate a dominant single mode of approximately 2200 Hz over most of the entire Mach number range analyzed. The mode strength increases with M above 0.45, the dominant frequency increases slightly with M.

Figure 21A:
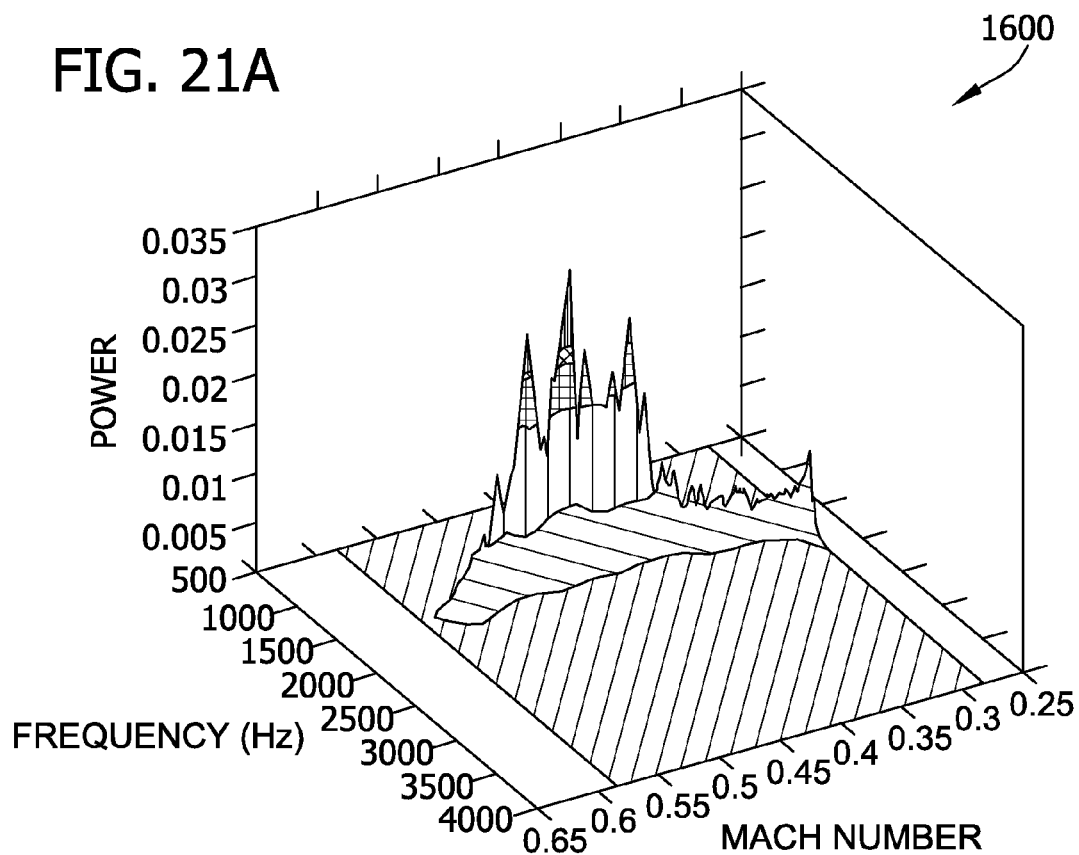
FIG. 21A is a three-dimensional graphical view of power versus frequency versus Mach number for a turret and fairing assembly having a second tapered raised lip configuration.
Figure 21B:
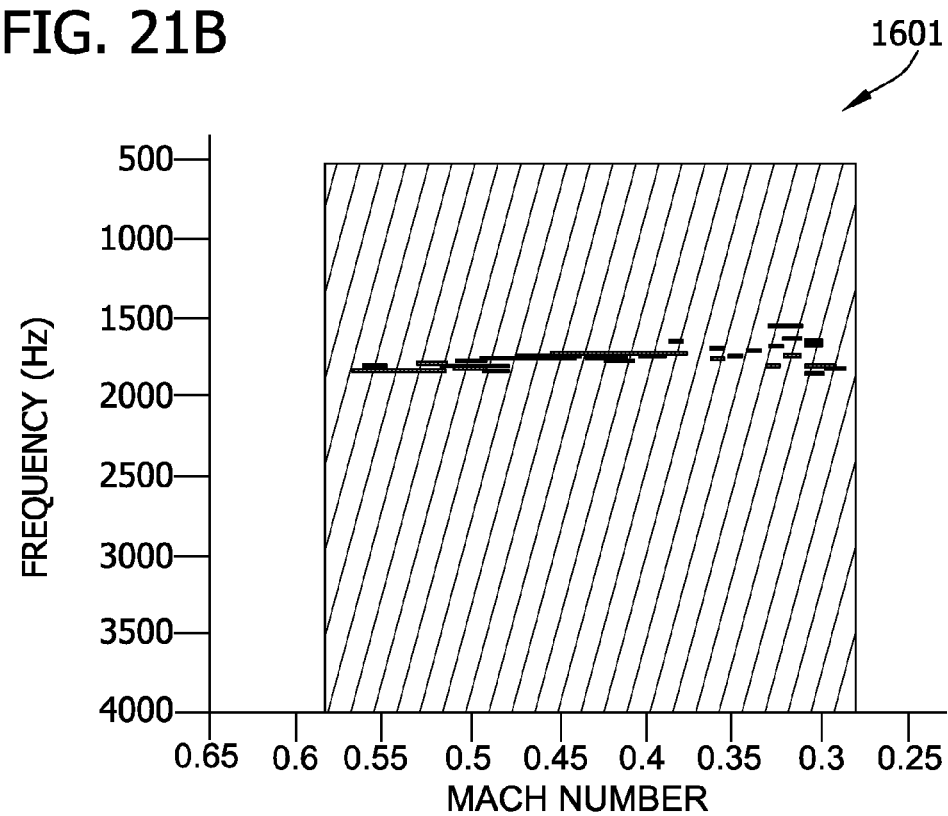
FIG. 21B is a two-dimensional graphical view of power versus frequency versus Mach number for a turret and fairing assembly having a second tapered raised lip configuration.

FIG. 21A is a three-dimensional graphical view 1600 of power versus frequency versus Mach number (M) for a turret and fairing assembly (not shown) having a first tapered raised lip configuration (not shown). FIG. 21B is a two-dimensional graphical view 1601 of power versus frequency versus Mach number (M) for a turret and fairing assembly (not shown) having a first tapered raised lip configuration (not shown). FIGS. 21A and 21B are associated with the configurations shown in FIGS. 19A and 19B.

In three-dimensional view 1600, frequency is represented on the y-axis in increments of 500 Hertz (Hz), Mach number is represented on the x-axis in increments of 0.05, and amplitude, or power is represented on the z-axis in increments of 0.002. In two-dimensional view 1601, frequency is represented on the y-axis in increments of 500 Hertz (Hz) and Mach number is represented on the x-axis in increments of 0.05. In this embodiment, the second configuration includes a medium-length covered cavity, in a wind tunnel with an acoustically treated top wall section (neither shown). FIGS. 21A and 21B illustrate a dominant single mode of approximately 1800 Hz over most of the entire Mach number range analyzed. The mode strength is highest between M=0.4 and 0.55. The dominant frequency increases slightly with M.

Figure 22A:
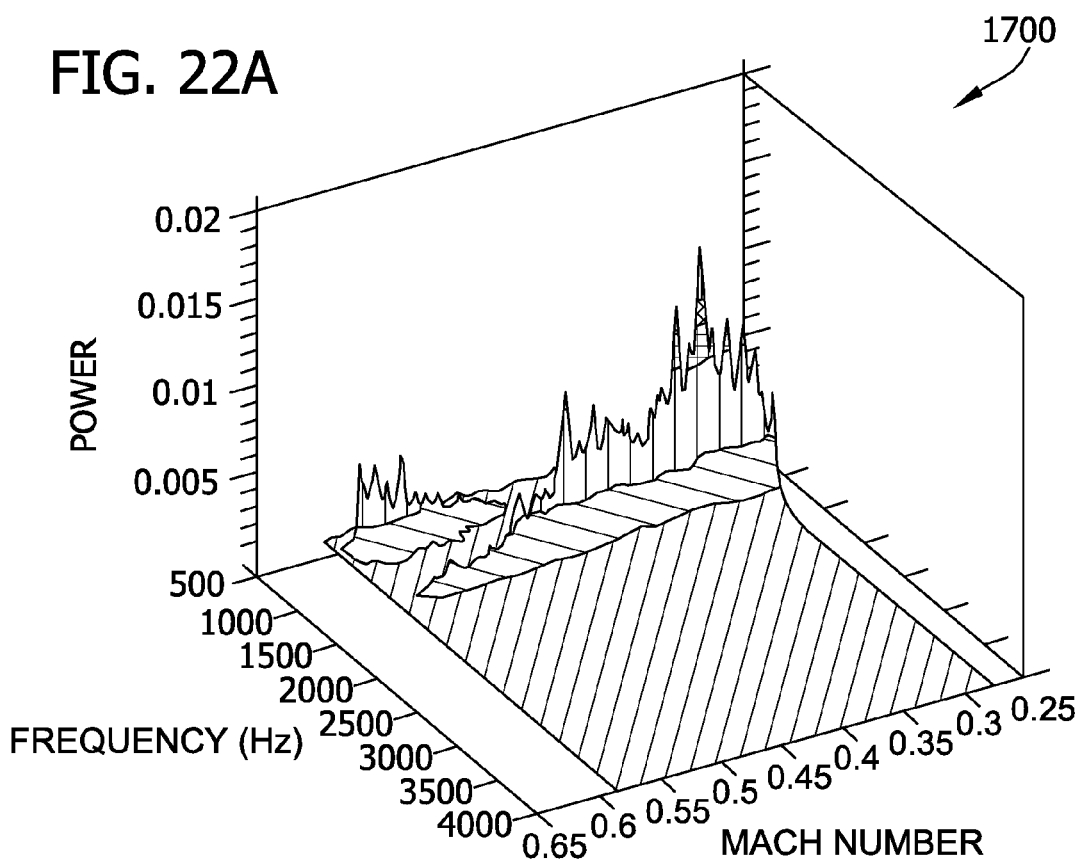
FIG. 22A is a three-dimensional graphical view of power versus frequency versus Mach number for a turret and fairing assembly having a third tapered raised lip configuration.
Figure 22B:
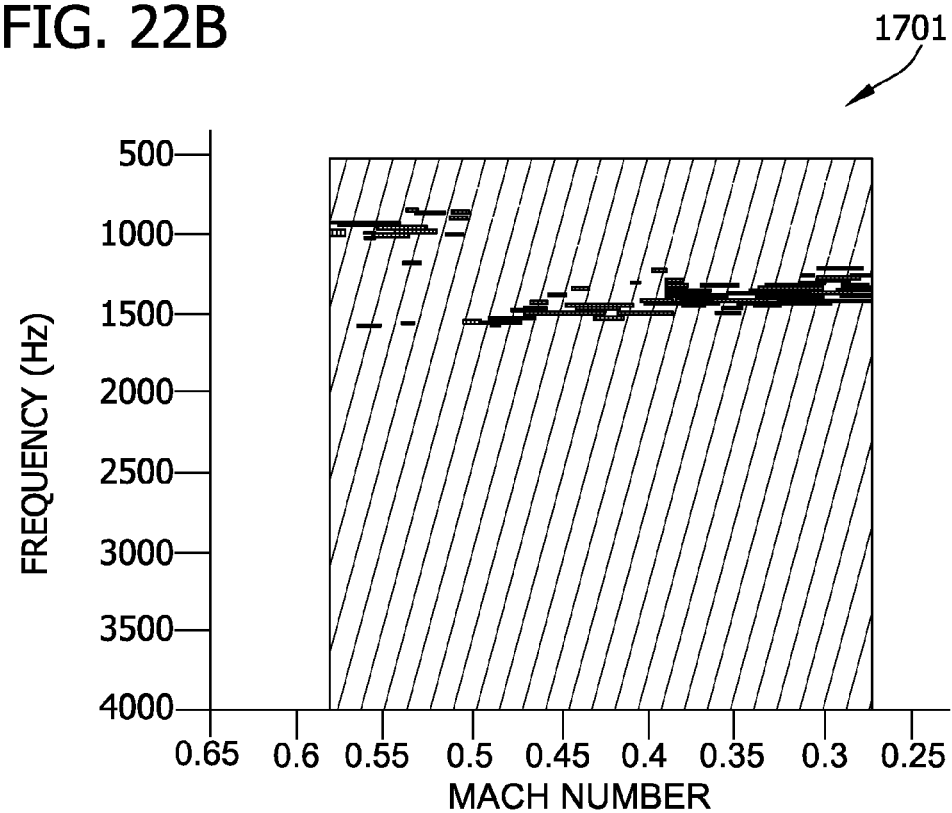
FIG. 22B is a two-dimensional graphical view of power versus frequency versus Mach number for a turret and fairing assembly having a third tapered raised lip configuration.

FIG. 22A is a three-dimensional graphical view 1700 of power versus frequency versus Mach number (M) for a turret and fairing assembly (not shown) having a first tapered raised lip configuration (not shown). FIG. 22B is a two-dimensional graphical view 1701 of power versus frequency versus Mach number (M) for a turret and fairing assembly (not shown) having a first tapered raised lip configuration (not shown). FIGS. 22A and 22B are associated with the configurations shown in FIGS. 19A and 19B.

In three-dimensional view 1700, frequency is represented on the y-axis in increments of 500 Hertz (Hz), Mach number is represented on the x-axis in increments of 0.05, and amplitude, or power is represented on the z-axis in increments of 0.002. In two-dimensional view 1701, frequency is represented on the y-axis in increments of 500 Hertz (Hz) and Mach number is represented on the x-axis in increments of 0.05. In this embodiment, the third configuration includes a long-length covered cavity, in a wind tunnel with an acoustically treated top wall section (neither shown). FIGS. 22A and 22B illustrate a dominant single mode of approximately 1500 Hz from M=0.27 to 0.5 that shifts to approximately 1000 Hz above M=0.5. The mode strength is highest between M=0.27 and 0.45. The dominant frequencies increase slightly with M.

Figure 23A:
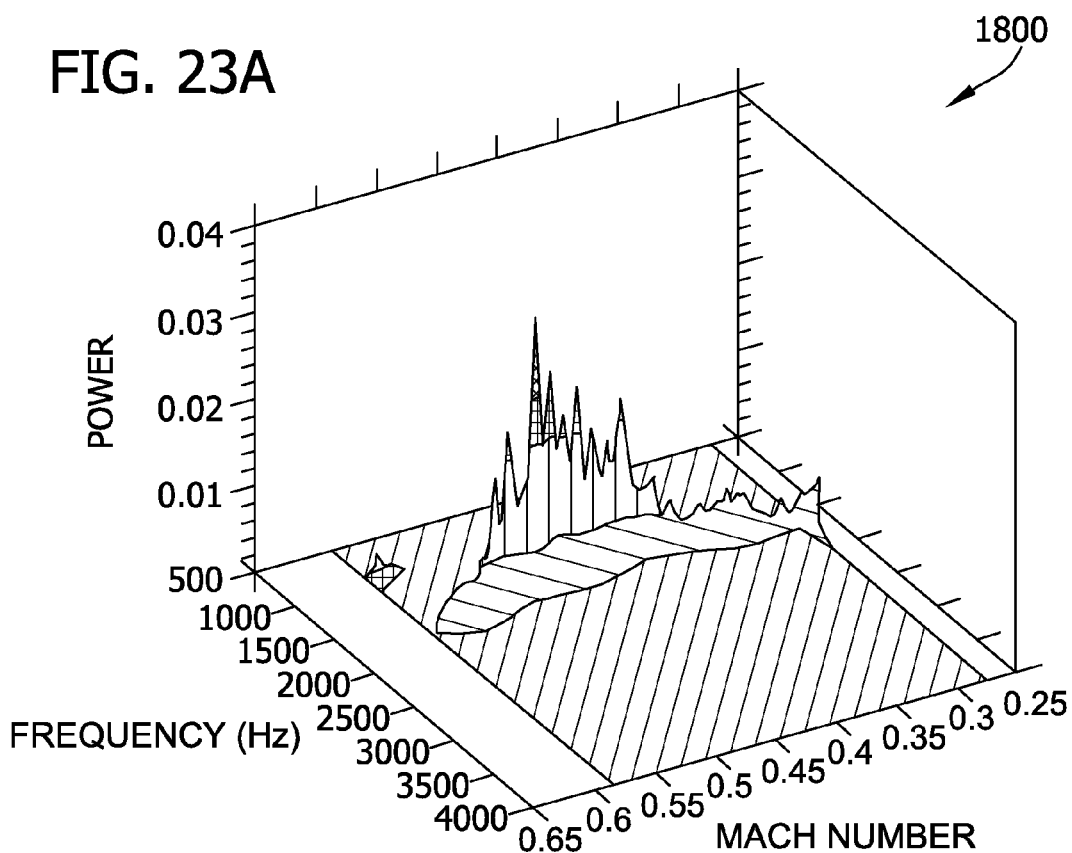
FIG. 23A is a three-dimensional graphical view of power versus frequency versus Mach number for a turret and fairing assembly having a fourth tapered raised lip configuration.
Figure 23B:
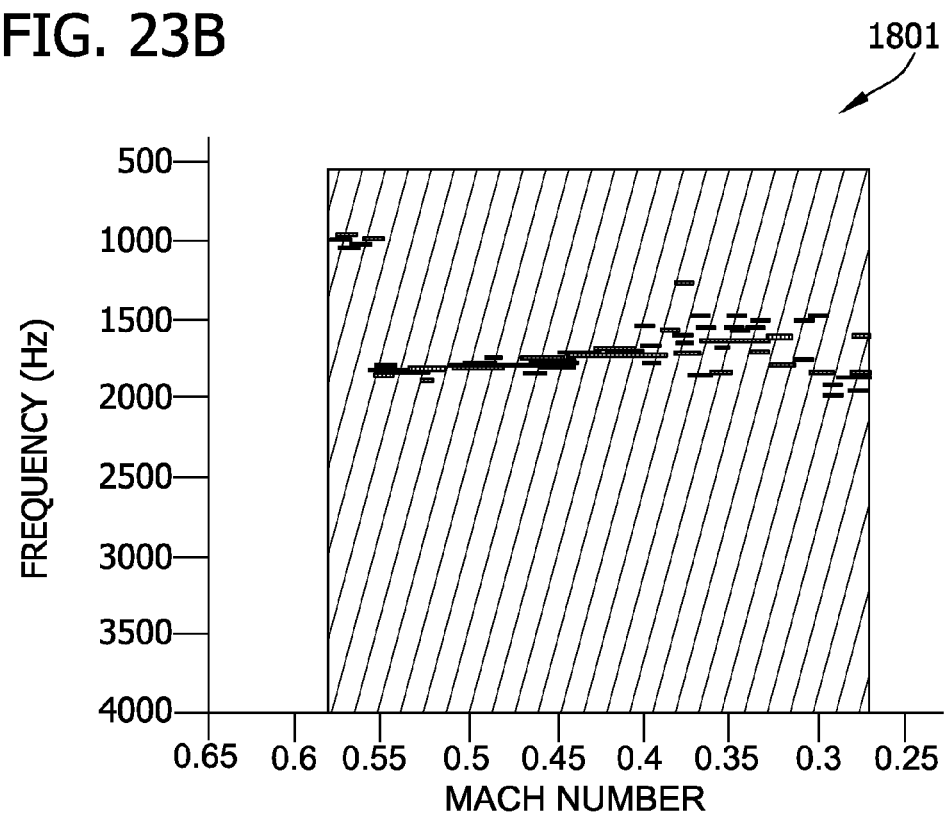
FIG. 23B is a two-dimensional graphical view of power versus frequency versus Mach number for a turret and fairing assembly having a fourth tapered raised lip configuration.

FIG. 23A is a three-dimensional graphical view 1800 of power versus frequency versus Mach number (M) for a turret and fairing assembly (not shown) having a first tapered raised lip configuration (not shown). FIG. 23B is a two-dimensional graphical view 1801 of power versus frequency versus Mach number (M) for a turret and fairing assembly (not shown) having a first tapered raised lip configuration (not shown). FIGS. 23A and 23B are associated with the configurations shown in FIGS. 19A and 19B.

In three-dimensional view 1800, frequency is represented on the y-axis in increments of 500 Hertz (Hz), Mach number is represented on the x-axis in increments of 0.05, and amplitude, or power is represented on the z-axis in increments of 0.002. In two-dimensional view 1801, frequency is represented on the y-axis in increments of 500 Hertz (Hz) and Mach number is represented on the x-axis in increments of 0.05. In this embodiment, the fourth configuration includes a medium-length covered cavity with a slot in the cavity ramp, in a wind tunnel with an acoustically treated top wall section (neither shown). FIGS. 23A and 23B are substantially similar to FIGS. 21A and 21B, respectively, wherein such similarity indicates that the slots in the cavity floor have minimal effects.

Figure 24A:
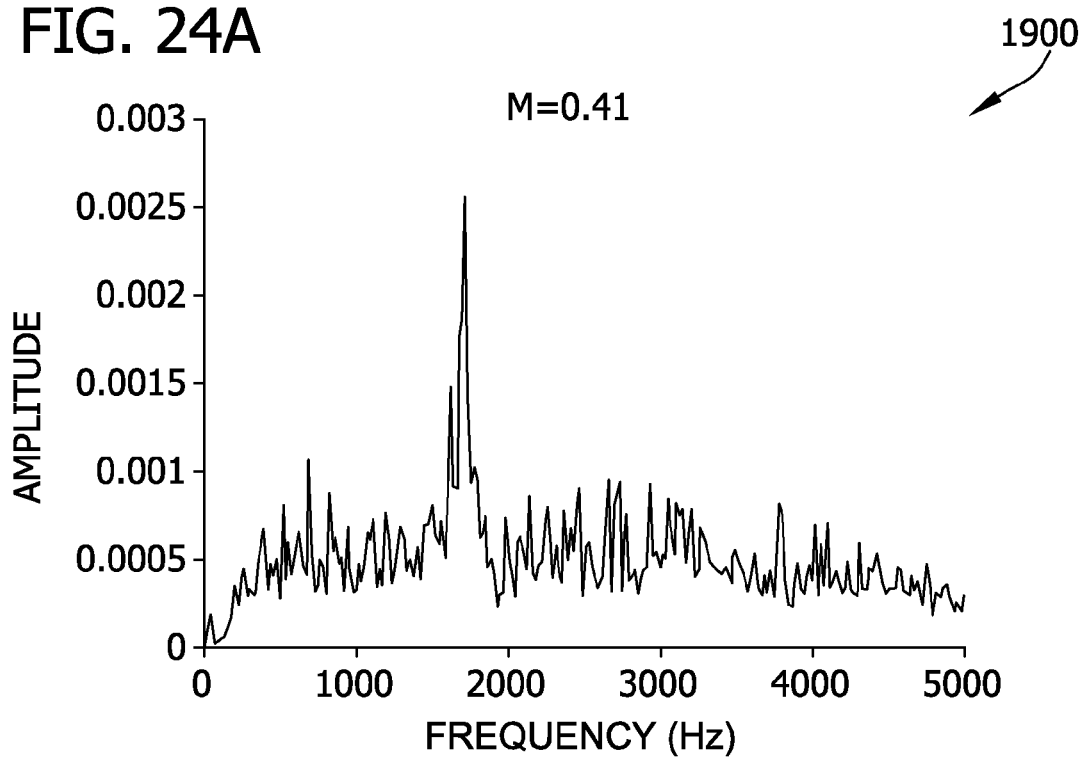
FIG. 24A is a graphical view of optical aberration versus frequency for a Mach number of 0.41 for the configuration associated with FIGS. 23A and 23B.
Figure 24B:
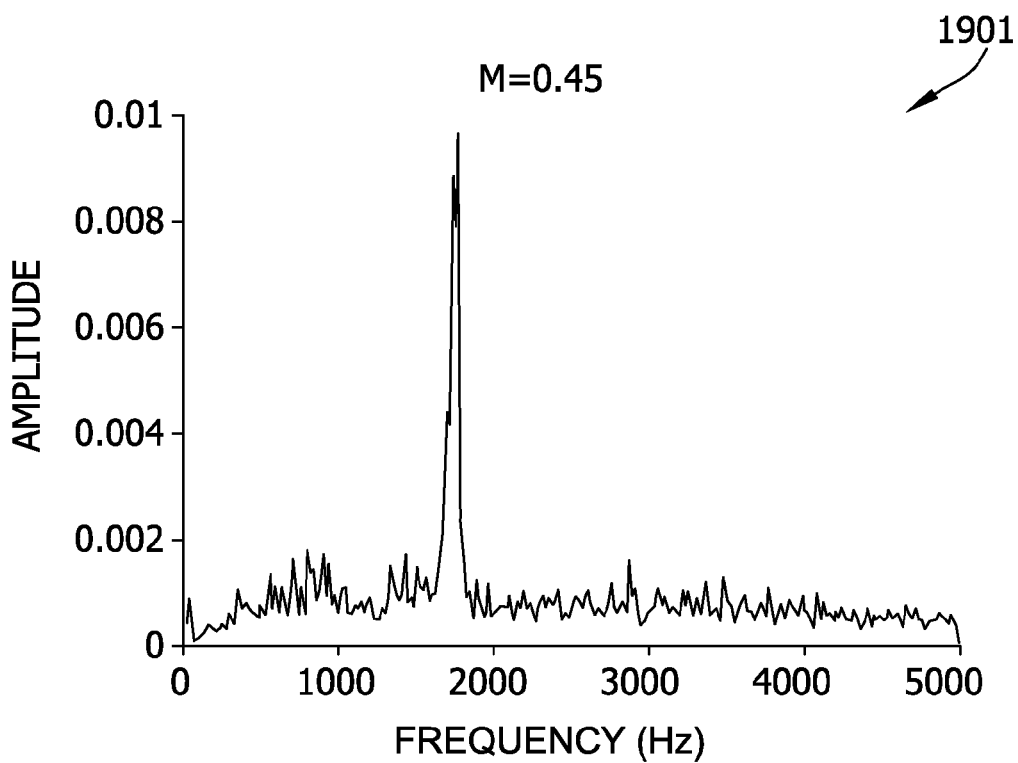
FIG. 24B is a graphical view of optical aberration versus frequency for a Mach number of 0.45 for the configuration associated with FIGS. 23A and 23B.
Figure 24C:
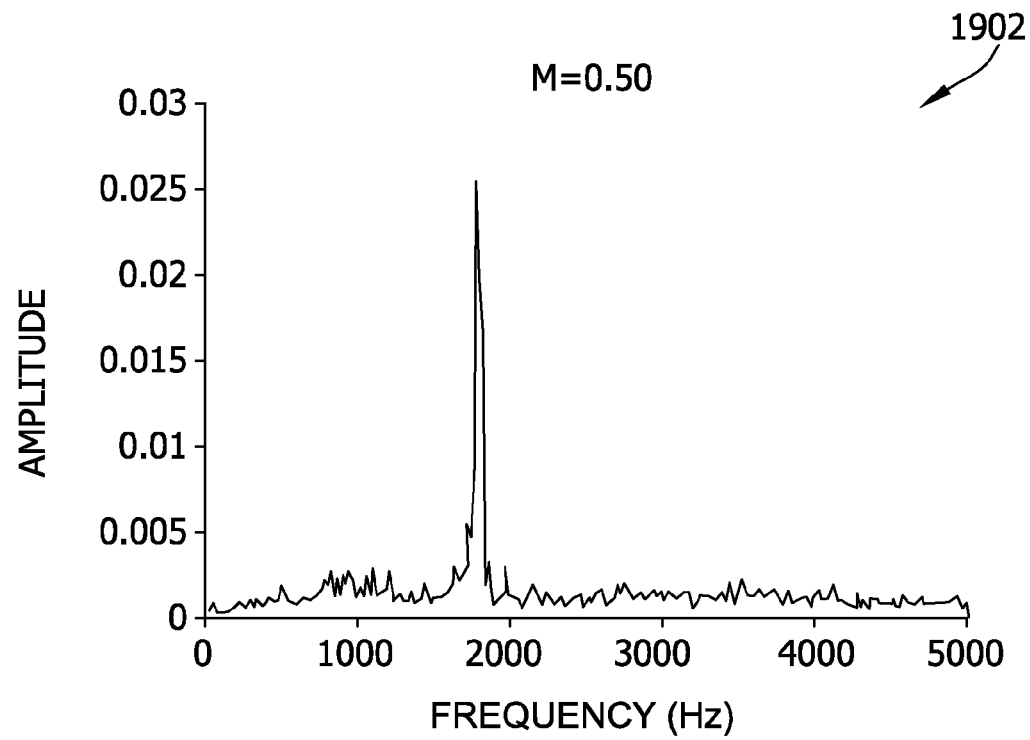
FIG. 24C is a graphical view of optical aberration versus frequency for a Mach number of 0.50 for the configuration associated with FIGS. 23A and 23B.
Figure 24D:
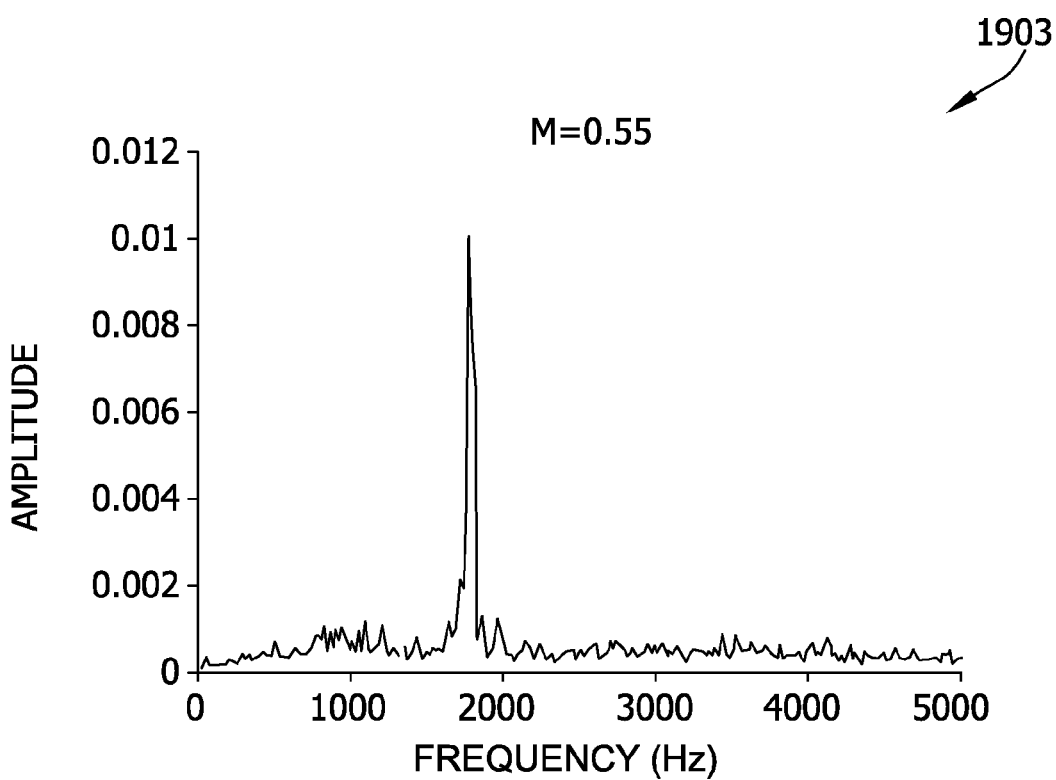
FIG. 24D is a graphical view of optical aberration versus frequency for a Mach number of 0.55 for the configuration associated with FIGS. 23A and 23B.

FIG. 24A is a graphical view 1900 of optical aberration versus frequency for a Mach number of 0.41 for the configuration associated with FIGS. 23A and 23B. FIG. 24B is a graphical view 1901 of optical aberration versus frequency for a Mach number of 0.45 for the configuration associated with FIGS. 23A and 23B. FIG. 24C is a graphical view 1902 of optical aberration versus frequency for a Mach number of 0.50 for the configuration associated with FIGS. 23A and 23B. FIG. 24D is a graphical view 1903 of optical aberration versus frequency for a Mach number of 0.55 for the configuration associated with FIGS. 23A and 23B.

In this embodiment, such fourth configuration includes a medium-length cavity in a wind tunnel with a hard top wall (neither shown). Similar spectral behaviors with respect to pressure indicates a strong correlation between pressure and optical aberration. Moreover, the condition of the wind tunnel top wall (hard or soft) appears to have a relatively small effect on aeroacoustic behavior for these small model experiments.

FIG. 25 is a flow chart illustrating an exemplary method 2000 for assembling exemplary turret and fairing assembly 200 (shown in FIGS. 1A, 1B, 2, 3, 4, 5, 6, 7, and 8). Exemplary method 2000 of assembling aircraft turret and fairing assembly 200 for housing aircraft-borne directed energy system, or device 203 (shown in FIGS. 1, 2, and 3) configured to generate and transmit directed energy beam 220 (shown in FIGS. 1, 2, and 3) includes coupling 2002 turret section 202 (shown in FIGS. 1A, 1B, 2, 3, 4, 5, 6, and 7) to at least a portion of aircraft fuselage 110 (shown in FIGS. 1A, 1B, 2, 3, 4, 5, and 6). Method 2000 also includes coupling 2004 aft fairing section 204 (shown in FIGS. 1A, 1B, 2, 3, 4, and 6) to at least a portion of aircraft fuselage 110. Aft fairing section 204 is positioned aft of and adjacent to turret section 202. Method 2000 further includes housing 2006 directed energy device 203 within turret section 202. Method 2000 also includes coupling 2008 at least one sensor (discussed further below) for detecting air speed of aircraft 100 and at least one of at least one air pressure sensor and at least one optical aberration sensor to at least a portion of at least one of turret section 202, aft fairing section 204, and aircraft fuselage 110. Turret section 202 and aft fairing section 204 are configured and positioned relative to one another to direct airflow for generating an aeroacoustic resonance within a desired frequency range in an area aft of the turret section.

In operation, a technical effect of method 2000 includes directing airflow to generate aeroacoustic resonances and concomitant aero-optic aberrations within the desired frequency range between cavity 224 (shown in FIGS. 1A, 1B, 3, 5, 6, and 7) and separated turbulent shear layer 310 (shown in FIGS. 9, 10, and 11) via tapered fairing portion 226 and fairing lip portion 228. Such aeroacoustic resonances and concomitant aero-optic aberrations are based on a predetermined range of air speed, wherein the aeroacoustic resonances are at least partially manifested as coherent air pressure oscillations within the desired frequency range between cavity 224 and separated turbulent shear layer 310 that is at least partially generated by turret and fairing assembly 200. Specifically, cavity 224 is configured to generate the aeroacoustic resonances within the desired frequency range and a desired amplitude within cavity 224 for the predetermined range of aircraft air speeds. Also, specifically, predetermined distance difference $\Delta h$ between H and R (all three shown in FIGS. 4, 5, and 6), wherein H is the height of fairing lip portion 228 and R is the radius of turret section 202. Values of predetermined difference $\Delta h$ facilitates tuning of the aeroacoustic resonances that facilitate regularizing concomitant aero-optic aberrations within the desired frequency range in an area aft of turret section 202

Figure 26:
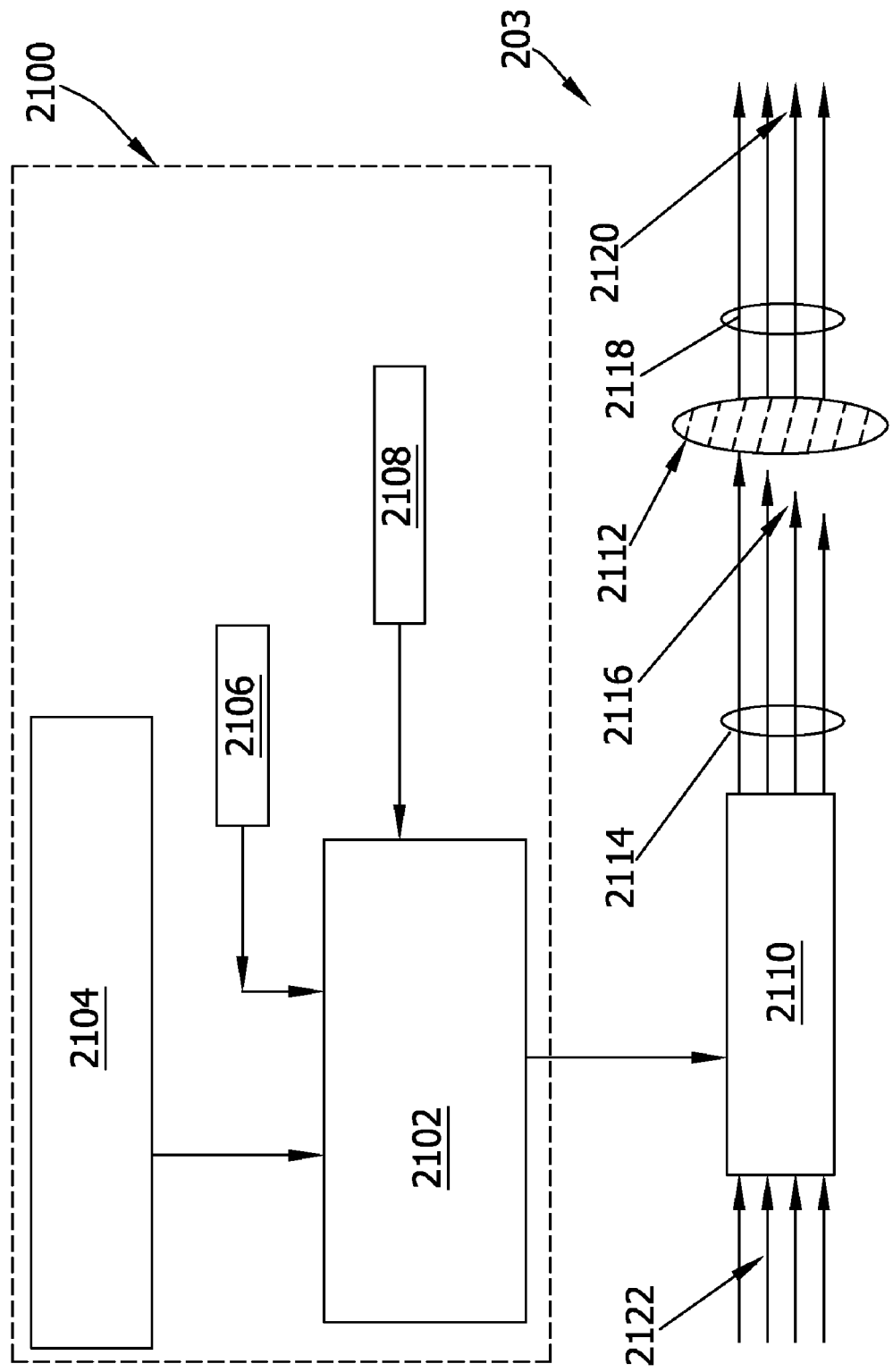
FIG. 26 is a block diagram of an exemplary optical propagation improvement system that may be used with the aircraft and the turret and fairing assembly shown in FIGS. 1A, 1B, 2, 3, 4, 5, 6, 7, and 8.

FIG. 26 is a block diagram of an exemplary optical propagation improvement system 2100 that may be used with aircraft 100 and turret and fairing assembly 200 (both shown in FIGS. 1 through 8). In the exemplary embodiment, system 2100 is integrated within a directed energy system, or device 203. Alternatively, system 2100 is a stand-alone system operating in conjunction with directed energy device 203. In the exemplary embodiment, the technical effects of operating system 2100 includes using feed-forward adaptive-optic correction methods for predictable aeroacoustic aberrations that facilitate operation of an automated control system for high-Mach shear layer formation and regularization, as well as Rossiter Mode regularization.

System 2100 includes at least one computer processor 2102. As used herein, the term "processor" is not limited to just those integrated circuits referred to in the art as a processor, but broadly refers to at least one microcontroller, microcomputer, programmable logic controller (PLC), application-specific integrated circuit, and other programmable circuits, and these terms are used interchangeably herein. In the exemplary embodiment, the processor includes an electronic memory (not shown) that includes, but is not limited to, a computer-readable medium such as random access memory (RAM). Alternatively, a floppy disk, a compact disc-read only memory (CD-ROM), a magneto-optical disk (MOD), a digital versatile disc (DVD), and/or other computer-readable medium may also be used.

Processor 2102 is programmed with data that includes, but is not limited to, aeroacoustic resonance data determined through design and construction of the directed energy system that includes spherical turret section 202 and aft fairing section 204 associated with aircraft 100 as discussed above. Such data includes, but is not limited to, aeroacoustic resonance frequencies and amplitudes as a function of air speed.

In the exemplary embodiment, system 2100 also includes a plurality of pressure sensors, or transducers 2104 positioned within cavity 224 (shown in FIGS. 1A, 1B, 3, 5, 6, and 7) that are coupled in data communication with processor 2102. Such pressure transducers 2104 are commercially available from Kulite Semiconductor Products, Leonia, N.J. and other suppliers. Alternatively, system 2100 includes a plurality of optical aberration sensors (not shown) that include, but are not limited to, Malley probes and Hartmann-Shack wavefront sensors. Hereon, discussions of transducers 2104 includes pressure sensors and optical aberration sensors in any combination without limitation.

Figure 27:
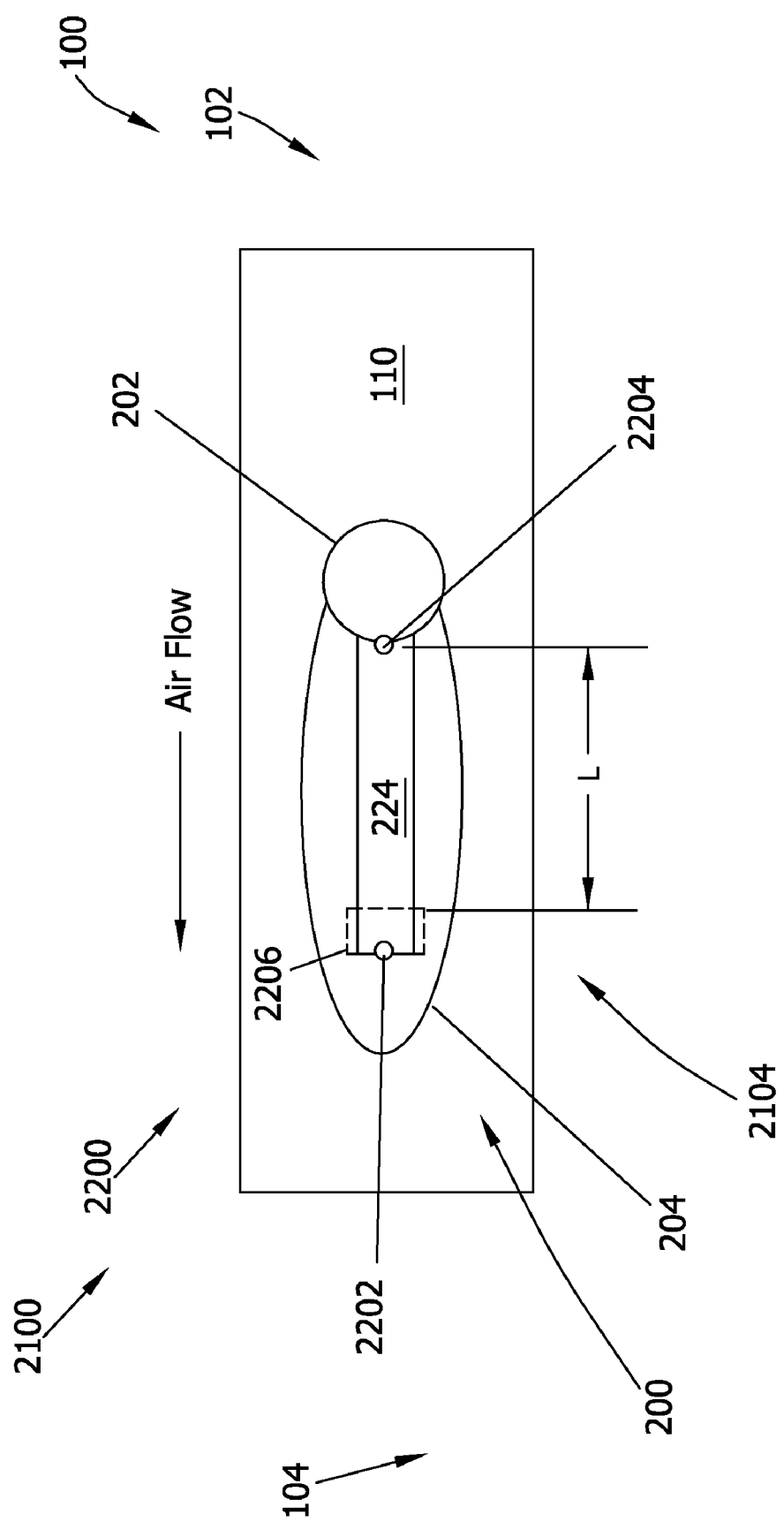
FIG. 27 is a schematic diagram of an exemplary pressure transducer/optical aberration sensor configuration that can be used with the optical propagation improvement system shown in FIG. 26.

FIG. 27 is a schematic diagram of an exemplary transducer configuration 2200 that can be used with optical propagation improvement system 2100. The acoustic field desired to be measured is in cavity 224, therefore, transducers 2104 are positioned in cavity 224. Specifically, in the exemplary embodiment, a first transducer 2202 is positioned at the aftmost portion of cavity 224 and a second transducer 2204 is positioned at the forwardmost portion of cavity 224. Alternatively, any number of transducers 2104 are positioned anywhere that facilitates operation of system 2100 as described herein.

Transducer configuration 2200 also includes a rigid material cover 2206 over first transducer 2202. Such cover 2206 should extend radially outward from fuselage 110 to a distance that exceeds radius R of spherical turret section 202.

System 2100 further includes at least one air speed sensor 2106 that is configured to generate and transmit air speed signals that are substantially representative of the air speed of aircraft 100. Air speed sensor 2106 is coupled in data communication with processor 2102. Processor 2102 is also coupled in data communication with at least one channel 2108 configured to transmit targeting elevation and azimuth data associated with directed energy device 203. In the exemplary embodiment, cutout 222 (shown in FIGS. 1A, 1B, 2, 3, 7, and 8) is covered with moveable cover 250 (shown in FIGS. 7 and 8) when exiting beam 220 (shown in FIGS. 1, 2, and 3) is directed towards targets in a range between 0° and 85° within 0° elevation 214 and 90° elevation 216 (both shown in FIG. 2) and uncovered for targets that are greater than 85° within 0° elevation 214 and 90° elevation 216. Moreover, system 2100 is not required for targets forward of the 90° elevation 216 and in such circumstances, system 2100 will typically not be used.

Processor 2102 is coupled in data communication with another portion of directed energy device 203. Specifically, in the exemplary embodiment, processor 2102 is coupled to a plurality of actuators (not shown) within an adaptive optic device, or, in the exemplary embodiment, a deformable mirror 2110. The array of actuators of deformable mirror 2110 are configured to orient the mirror surface, thereby controlling the wavefront of the beam. Specifically, the actuators are configured to operate together to create a reflective surface (not shown) as substantially equivalent to a conjugate waveform of the aero-optic disturbance formed aft of turret section 202 before directing beam 220 through an air turbulence, that is an aberrating fluid mechanism 2112. By passing a first beam 2114 with a first, or intentionally aberrated conjugate wavefront 2116 through aberrating fluid mechanism 2112, a second beam 2118 is generated exiting aberrating fluid mechanism 2112, wherein second beam 2118 includes a second, or corrected wavefront 2120. The technical effect is that second beam 2118 is a corrected and focused beam that facilitates directing a greater portion of directed energy toward a target.

Figure 28:
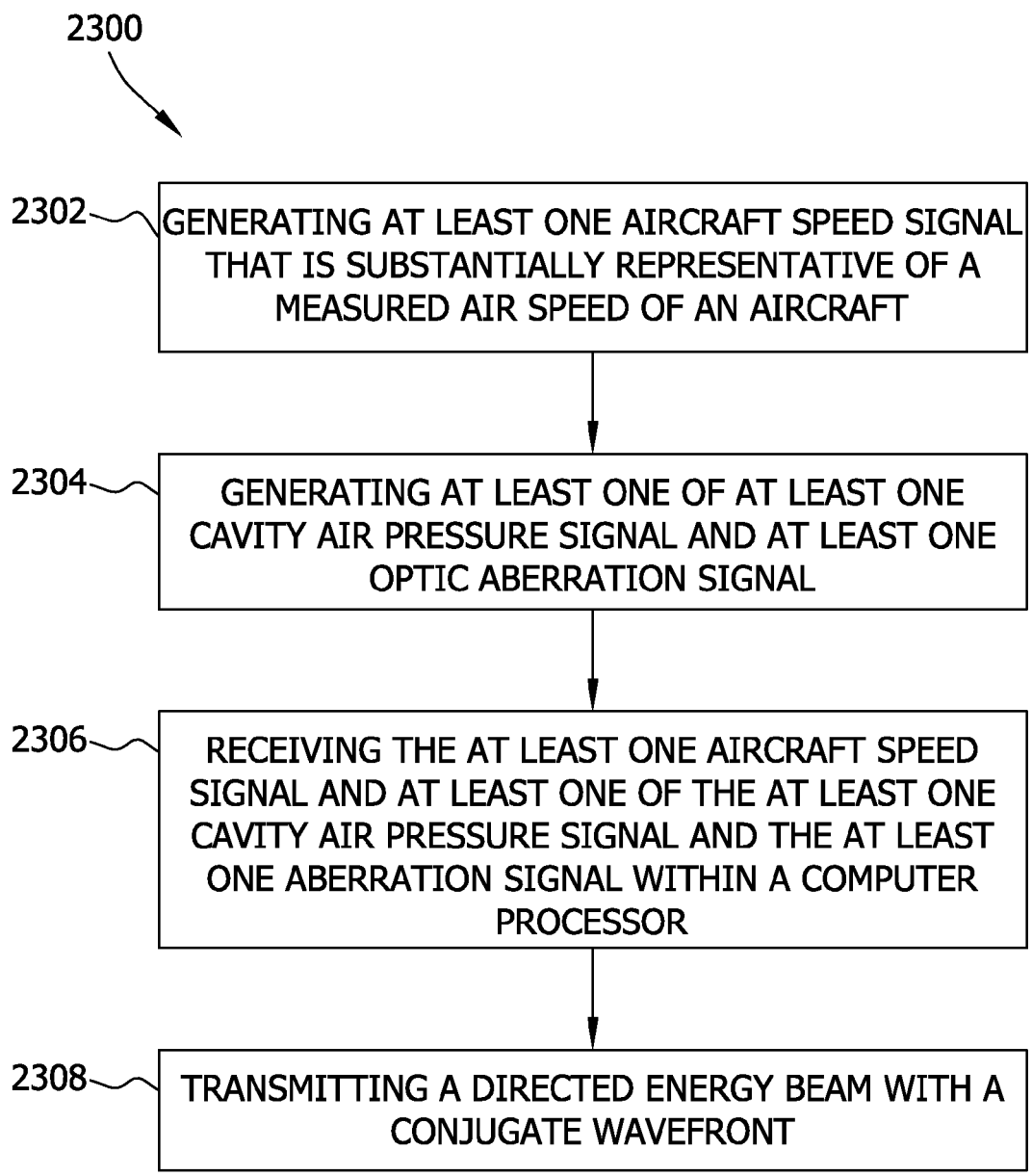
FIG. 28 is a flow chart illustrating an exemplary method for improving optical propagation of a directed energy system.

FIG. 28 is a flow chart illustrating an exemplary method 2300 for improving optical propagation of directed energy system, or device 203. Exemplary method 2300 for facilitating optical propagation of directed energy beam 220 includes generating 2302 at least one aircraft speed signal that is substantially representative of a measured air speed of aircraft 100. Method 2300 also includes generating 2304 at least one of at least one cavity air pressure signal and at least one optical aberration signal that is substantially representative of at least one measured air pressure and aberrated wavefront, respectively, within cavity 224 that is defined within at least a portion of aircraft 100. Method 2300 further includes receiving 2306 the at least one aircraft speed signal and at least one of the at least one cavity air pressure signal and the at least one optical aberration signal within computer processor 2102.

Method 2300 also includes transmitting 2308 directed energy beam, or first beam 2114 with conjugate wavefront 2116.

In operation, when an aft target is selected, processor 2102 receives signals from transducers 2202 and 2204. These signals are representative of shear layer turbulence, that is, aberrating fluid mechanism 2112 formed aft of spherical turret section 202. Processor 2102 characterizes the turbulence based on the pressure and/or wavefront signals and the air speed signals. The technical effect is processor 2102 drives at least a portion of the mirrors within deformable mirror 2110 to reflect a standard directed energy beam 2122 to generate first beam 2114 that has wavefront 2116 having portions of the beam out of phase with other portions. Such first beam wavefront 2116 is configured such that transit through turbulence (with the determined indices of refraction) results in second beam 2118 with wavefront 2120 wherein most portions of second beam 2118 are substantially in phase, or optimized.

Figure 29:
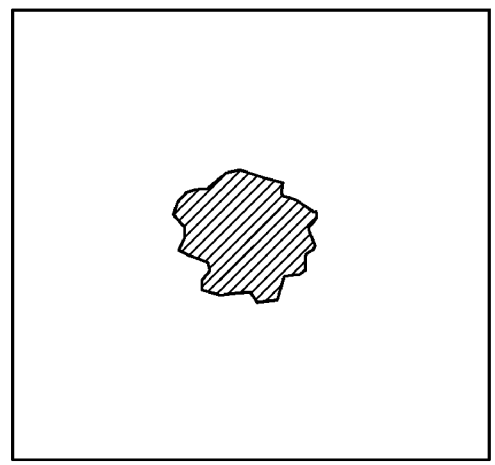
FIG. 29 is a pictorial view of an uncorrected directed energy beam.
Figure 30:
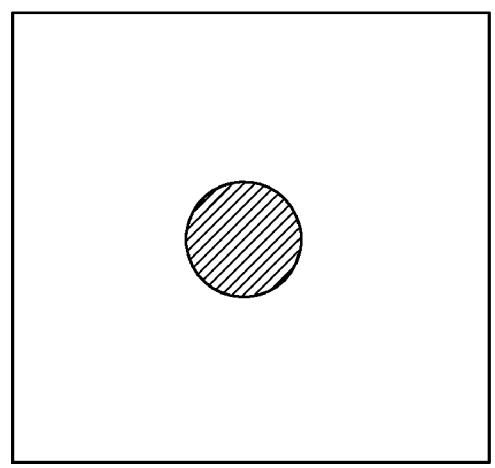
FIG. 30 is a pictorial view of a corrected directed energy beam.

The technical effect of combining exemplary turret and fairing assembly 200 and system 2100 is that the aeroacoustic resonance in cavity 224 is regularized and the shear layer structures 318 of shear layer 310 are generated such that feed-forward adaptive-optic correction using deformable mirror 2110 is facilitated. To illustrate the improvement in the beam wavefronts produced by system 2100, the uncorrected and corrected wavefronts for a typical case are presented in FIGS. 29 and 30, respectively. Specifically, FIG. 29 is a pictorial view 2400 of an uncorrected directed energy beam. The wavefront of the associated directed energy beam is out-of phase and includes a significant amount of photon scattering. FIG. 30 is a pictorial view 2500 of a corrected directed energy beam. The wavefront of the associated directed energy beam is substantially in-phase and includes a significant reduction in photon scattering.

Further alternative embodiments include a cavity cover (not shown), whose length is the difference between lengths L1 and L2 (both shown in FIG. 6), that may be used. This cover, when chosen appropriately, results in a design that produces a single strong resonance at a frequency that is a function of Mach number. An effective single frequency resonance can be maintained over a larger range in flight speed by an adjustment (during flight) in the lengths L1 and L2.

The methods and apparatus for detecting pressure changes in the vicinity of an aircraft turret and fairing facilitate detection of an unsteady pressure in the vicinity of a directed energy system. Such detection facilitates adjusting such direct energy system in a manner that improves optical propagation through such pressure changes. Moreover, the method for determining dimensional parameters of the aircraft turret and fairing facilitates generating an aeroacoustic resonance within a desired frequency range. Such resonance isolation facilitates detection of the aeroacoustic resonance and the subsequent optical propagation improvement.

Exemplary embodiments of aircraft turrets and fairings as associated with directed energy weapon or communication systems are described above in detail. The methods, apparatus and systems are not limited to the specific embodiments described herein nor to the specific illustrated turrets and fairings.

While the invention has been described in terms of various specific embodiments, those skilled in the art will recognize that the invention can be practiced with modification within the spirit and scope of the claims.

What is claimed is:

1. An aircraft turret and fairing assembly for facilitating transmission of a directed energy beam from a directed energy device, said aircraft turret and fairing assembly comprising:
   a turret section for directing an energy beam;
   a fairing section aft of and adjacent to said turret section, each of said turret section and said aft fairing section coupled to an aircraft;
   a tapered fairing portion aft of said turret section and a fairing lip portion aft of said tapered fairing portion, said fairing lip portion comprising a cavity, wherein said tapered fairing portion comprises a cover moveable from a closed position to an open position, and a cutout portion that is exposed when said cover is in the open position; and
   at least one sensor for detecting air speed of the aircraft and air pressure,
   wherein said turret section and said aft fairing section are configured and positioned relative to one another to direct airflow for generating an aeroacoustic resonance within a desired frequency range in an area aft of said turret section.

2. An aircraft turret and fairing assembly in accordance with claim 1 wherein said aft fairing section comprises a tapered fairing portion comprising an outer surface having an expanding fore-to-aft frusto-conical shape for defining a substantially symmetrical and constant linear taper having a predetermined fairing taper angle with respect to a general direction of flight.

3. An aircraft turret and fairing assembly in accordance with claim 1 wherein said aft fairing section comprises a tapered fairing portion aft of said turret section and a fairing lip portion aft of said tapered fairing portion, said fairing lip portion comprising a cavity.

4. An aircraft turret and fairing assembly in accordance with claim 3 wherein said tapered fairing portion and said fairing lip portion direct airflow to generate aeroacoustic resonances that facilitate regularizing concomitant aero-optic aberrations within the desired frequency range in an area aft of said turret section.

5. An aircraft turret and fairing assembly in accordance with claim 3 wherein said tapered fairing portion and said fairing lip portion direct airflow to generate aeroacoustic resonances that facilitate regularizing concomitant aero-optic aberrations based on a predetermined range of air speed, wherein the aeroacoustic resonances are at least partially manifested as quasi-periodic air pressure oscillations within the cavity that stimulate coherent motions of a separated turbulent shear layer that spans the cavity.

6. An aircraft turret and fairing assembly in accordance with claim 1 wherein said aft fairing section comprises a cavity having a predetermined size and orientation to facilitate generating the aeroacoustic resonances within the desired frequency range within the cavity for a predetermined range of aircraft air speeds.

7. An aircraft turret and fairing assembly in accordance with claim 6 wherein the cavity is further configured to generate the aeroacoustic resonances within the desired frequency range and at a desired amplitude within the cavity for the predetermined range of aircraft air speeds.

8. An aircraft turret and fairing assembly in accordance with claim 1 wherein said aft fairing section comprises a tapered fairing portion, a fairing lip portion, and an aftmost fairing portion, wherein said tapered fairing portion is positioned adjacent to and aft of said turret section, said fairing lip portion is positioned adjacent to and aft of said tapered fairing portion, and said aftmost fairing portion is positioned adjacent to and aft of said fairing lip portion.

9. An aircraft turret and fairing assembly in accordance with claim 8 wherein said fairing lip portion comprises an outer surface having a leading end and an aft end, said outer surface extending between the leading end and the aft end, wherein the leading end defines a first distance extending from the aircraft and the aft end defines a second distance extending from the aircraft, the second distance is one of substantially equal to and greater than the first distance.

10. An aircraft turret and fairing assembly in accordance with claim 1 wherein said turret section comprises an outer surface having a substantially spherical shape with a predetermined radius, wherein the turret radius extends radially outward from a center of said turret section to the outer surface of said turret section.

11. An aircraft turret and fairing assembly in accordance with claim 1 wherein said aft fairing section comprises a tapered fairing portion and a fairing lip portion, wherein said tapered fairing portion is positioned adjacent to and aft of said turret section, said fairing lip portion is positioned adjacent to and aft of said tapered fairing portion, wherein said fairing lip portion comprises an outer surface extending a first distance from a portion of the aircraft through an elevation plane and said turret section comprises an outer surface extending a second distance from a portion of the aircraft through the elevation plane, wherein a difference value between the first distance and the second distance is predetermined.

12. An aircraft turret and fairing assembly in accordance with claim 11 wherein said predetermined difference value promotes tuning of the aeroacoustic resonances that facilitate regularizing concomitant aero-optic aberrations within the desired frequency range in an area aft of said turret section.

13. An aircraft turret and fairing assembly in accordance with claim 11 wherein said fairing lip portion comprises a cavity including a floor surface and said tapered fairing portion comprises a ramped floor surface connected to the cavity floor surface.

14. An aircraft turret and fairing assembly in accordance with claim 13 wherein said cavity floor surface and said ramped floor surface define a first length (L1), and said cavity floor surface defines a second length (L2).

15. An aircraft turret and fairing assembly in accordance with claim 14 wherein said first length (L1) and said second length (L2) are related by $$L1=K+L2$$

wherein K is a predetermined constant.

16. An aircraft turret and fairing assembly in accordance with claim 1 wherein said turret section and said fairing section are configured to provide a field of regard for the directed energy device that includes:
a range of elevation angles of at least approximately 0° to approximately 160°; and
a range of azimuthal values of at least approximately −80° to approximately 80°.

17. An aircraft turret and fairing assembly in accordance with claim 1 wherein said moveable cover is:
in the closed position when the directed energy beam is transmitted from the directed energy device and the directed energy device has an elevation ranging between approximately 0 degrees and approximately 85 degrees; and
in the open position when the directed energy beam is transmitted from the directed energy device and the directed energy device has an elevation that is greater than approximately 85 degrees.

18. An aircraft turret and fairing assembly in accordance with claim 1 wherein said aft fairing section comprises a tapered fairing portion aft of said turret section and a fairing lip portion aft of said tapered fairing portion, said fairing lip portion comprising a cavity, wherein said aircraft turret and fairing assembly further comprises a computer processor in communication with said at least one sensor, said computer processor configured to:
receive from said at least one sensor a signal substantially representative of at least one of an air pressure and an optical aberration within the cavity;
control the directed energy device based on the received signal; and
enable the directed energy device to transmit a directed energy beam with a conjugate wavefront.

19. An aircraft turret and fairing assembly in accordance with claim 1 wherein said aft fairing section comprises a tapered fairing portion aft of said turret section and a fairing lip portion aft of said tapered fairing portion, said fairing lip portion comprising a cavity, said tapered fairing portion and said fairing lip portion direct airflow to generate aeroacoustic resonances that facilitate regularizing concomitant aero-optic aberrations within the desired frequency range, wherein said aircraft and fairing assembly further comprises a computer processor in communication with said at least one sensor, said computer processor configured to:
determine effects of the separated turbulent shear layer on the directed energy beam including distortions to a phase of the energy beam's wavefront; and
determine an adjusted wavefront of the directed energy beam prior to transmission through the separated turbulent shear layer based on the determined effects such that the energy beam's wavefront is optimized after transmission through the separated turbulent shear layer.

20. An aircraft turret and fairing assembly in accordance with claim 19 further comprising an adaptive optic device, wherein said adaptive optic device is configured to adjust the phase of the energy beam's wavefront prior to transmission through the separated turbulent shear layer such that the energy beam's wavefront is optimized after transmission through the separated turbulent shear layer.

21. An aircraft for facilitating transmission of a directed energy beam from a directed energy device coupled to said aircraft, said aircraft comprising:
a fuselage; and
an aircraft turret and fairing assembly for facilitating transmission of a directed energy beam from a directed energy device, said aircraft turret and fairing assembly comprising:
a turret section for directing the energy beam;
a fairing section aft of and adjacent to said turret section, each of said turret section and said aft fairing section coupled to at least a portion of said fuselage,
wherein said aft fairing section comprises a tapered fairing portion aft of said turret section and a fairing lip portion aft of said tapered fairing portion, said fairing lip portion comprising a cavity, wherein said tapered fairing portion comprises a cover moveable from a closed position to an open position, and a cutout portion that is exposed when said cover is in the open position, and
at least one sensor for detecting air speed of the aircraft and air pressure,
wherein said turret section and said aft fairing section are configured and positioned relative to one another to direct airflow for generating an aeroacoustic resonance within a desired frequency range in an area aft of said turret section.

22. An aircraft in accordance with claim 21 wherein said aft fairing section comprises a tapered fairing portion comprising an outer surface having an expanding fore-to-aft frusto-conical shape for defining a substantially symmetrical and constant linear taper having a predetermined fairing taper angle with respect to a general direction of flight.

23. An aircraft in accordance with claim 21 wherein said aft fairing section comprises a tapered fairing portion aft of said turret section and a fairing lip portion aft of said tapered fairing portion, said fairing lip portion comprising a cavity.

24. An aircraft in accordance with claim 23 wherein said tapered fairing portion and said fairing lip portion direct airflow to generate aeroacoustic resonances that facilitate regularizing concomitant aero-optic aberrations within the desired frequency range in an area aft of said turret section.

25. An aircraft in accordance with claim 23 wherein said tapered fairing portion and said fairing lip portion direct airflow to generate aeroacoustic resonances that facilitate regularizing concomitant aero-optic aberrations based on a predetermined range of air speed, wherein the aeroacoustic resonances are at least partially manifested as quasi-periodic air pressure oscillations within the cavity that stimulate coherent motions of a separated turbulent shear layer that spans the cavity.

26. An aircraft in accordance with claim 21 wherein said aft fairing section comprises a cavity having a predetermined size and orientation to facilitate generating the aeroacoustic resonances within the desired frequency range within the cavity for a predetermined range of aircraft air speeds.

27. An aircraft in accordance with claim 26 wherein the cavity is further configured to generate the aeroacoustic resonances within the desired frequency range and at a desired amplitude within the cavity for the predetermined range of aircraft air speeds.

28. An aircraft in accordance with claim 21 wherein said aft fairing section comprises a tapered fairing portion, a fairing lip portion, and an aftmost fairing portion, wherein said tapered fairing portion is positioned adjacent to and aft of said turret section, said fairing lip portion is positioned adjacent to and aft of said tapered fairing portion, and said aftmost fairing portion is positioned adjacent to and aft of said fairing lip portion.

29. An aircraft in accordance with claim 28 wherein said fairing lip portion comprises an outer surface having a leading end and an aft end, said outer surface extending between the leading end and the aft end, wherein the leading end defines a first distance extending from said fuselage and the aft end defines a second distance extending from said fuselage, the second distance is one of substantially equal to and greater than the first distance.

30. An aircraft in accordance with claim 21 wherein said turret section comprises an outer surface having a substantially spherical shape with a predetermined radius, wherein the turret radius extends radially outward from a center of said turret section to the outer surface of said turret section.

31. An aircraft in accordance with claim 21 wherein said aft fairing section comprises a tapered fairing portion and a fairing lip portion, wherein said tapered fairing portion is positioned adjacent to and aft of said turret section, said fairing lip portion is positioned adjacent to and aft of said tapered fairing portion, wherein said fairing lip portion comprises an outer surface extending a first distance from a portion of said fuselage through an elevation plane and said turret section comprises an outer surface extending a second distance from a portion of said fuselage through the elevation plane, wherein a difference value between the first distance and the second distance is predetermined.

32. An aircraft in accordance with claim 31 wherein said predetermined difference value promotes tuning of the aeroacoustic resonances that facilitate regularizing concomitant aero-optic aberrations within the desired frequency range in an area aft of said turret section.

33. An aircraft in accordance with claim 31 wherein said fairing lip portion comprises a cavity including a floor surface and said tapered fairing portion comprises a ramped floor surface connected to the cavity floor surface.

34. An aircraft in accordance with claim 33 wherein said cavity floor surface and said ramped floor surface define a first length ($L1$), and said cavity floor surface defines a second length ($L2$).

35. An aircraft in accordance with claim 34 wherein said first length ($L1$) and said second length ($L2$) are related by $$L1 = K + L2$$

wherein K is a predetermined constant.

36. An aircraft in accordance with claim 21 wherein said turret section and said fairing section are configured to provide a field of regard for the directed energy device that includes:
a range of elevation angles of at least approximately 0° to approximately 160°; and
a range of azimuthal values of at least approximately −80° to approximately 80°.

37. An aircraft in accordance with claim 21 wherein said moveable cover is:
in the closed position when the directed energy beam is transmitted from the directed energy device and the directed energy device has an elevation ranging between approximately 0 degrees and approximately 85 degrees; and
in the open position when the directed energy beam is transmitted from the directed energy device and the directed energy device has an elevation that is greater than approximately 85 degrees.

38. An aircraft in accordance with claim 21 wherein said aft fairing section comprises a tapered fairing portion aft of said turret section and a fairing lip portion aft of said tapered fairing portion, said fairing lip portion comprising a cavity, wherein said aircraft further comprises a computer processor in communication with said at least one sensor, said computer processor configured to:
receive from said at least one sensor a signal substantially representative of at least one of an air pressure and an optical aberration within the cavity;
control the directed energy device based on the received signal; and
enable the directed energy device to transmit a directed energy beam with a conjugate wavefront.

39. An aircraft in accordance with claim 21 wherein said aft fairing section comprises a tapered fairing portion aft of said turret section and a fairing lip portion aft of said tapered fairing portion, said fairing lip portion comprising a cavity, said tapered fairing portion and said fairing lip portion direct airflow to generate aeroacoustic resonances that facilitate regularizing concomitant aero-optic aberrations within the desired frequency range, wherein said aircraft and fairing assembly further comprises a computer processor in communication with said at least one sensor, said computer processor configured to:

determine effects of the separated turbulent shear layer on the directed energy beam including distortions to a phase of the energy beam's wavefront; and determine an adjusted wavefront of the directed energy beam prior to transmission through the separated turbulent shear layer based on the determined effects such that the energy beam's wavefront is optimized after transmission through the separated turbulent shear layer.

40. An aircraft in accordance with claim 39 further comprising an adaptive optic device, wherein said adaptive optic device is configured to adjust the phase of the energy beam's wavefront prior to transmission through the separated turbulent shear layer such that the energy beam's wavefront is optimized after transmission through the separated turbulent shear layer.

41. A method of assembling an aircraft turret and fairing assembly for housing an aircraft-borne directed energy system configured to generate and transmit a directed energy beam, said method comprising:

coupling a turret section to at least a portion of an aircraft fuselage;

coupling an aft fairing section to at least a portion of the aircraft fuselage, the aft fairing section positioned aft of and adjacent to the turret section, wherein coupling an aft fairing section to at least a portion of the aircraft fuselage comprises:

positioning a tapered fairing portion aft of the turret section;

positioning a fairing lip portion aft of the tapered fairing portion;

defining a cavity within the fairing lip portion;

defining a cutout portion within the tapered fairing portion; and coupling a moveable cover to at least a portion of the tapered fairing portion, the cover is moveable from a closed position to an open position, and at least a portion of the cutout portion is exposed when the cover is in the open position;

housing a directed energy device within the turret section; and coupling at least one sensor for detecting air speed of the aircraft and at least one of air pressure and optic aberrations to at least a portion of at least one of the turret section, the aft fairing section, and the aircraft fuselage, wherein the turret section and the aft fairing section are configured and positioned relative to one another to direct airflow for generating an aeroacoustic resonance within a desired frequency range in an area aft of the turret section.

42. A method in accordance with claim 41 wherein coupling an aft fairing section to at least a portion of the aircraft fuselage comprises assembling a tapered fairing portion of the aft fairing section, the tapered fairing portion including an outer surface having an expanding fore-to-aft frusto-conical shape for defining a substantially symmetrical and constant linear taper having a predetermined fairing taper angle with respect to at least a portion of the aircraft fuselage.

43. A method in accordance with claim 41 wherein coupling an aft fairing section to at least a portion of the aircraft fuselage comprises:

positioning a tapered fairing portion aft of the turret section; and positioning a fairing lip portion aft of the tapered fairing portion, the fairing lip portion having a cavity.

44. A method in accordance with claim 43 further comprising forming and positioning the tapered fairing portion and the fairing lip portion in physical relationship to each other to direct airflow to generate aeroacoustic resonances, thereby facilitating regularizing concomitant aero-optic aberrations within the desired frequency range in an area aft of the turret section.

45. A method in accordance with claim 43 further comprising forming and positioning the tapered fairing portion and the fairing lip portion in physical relationship to each other to direct airflow to generate aeroacoustic resonances and concomitant aero-optic aberrations based on a predetermined range of air speed, wherein the aeroacoustic resonances are at least partially manifested as quasi-periodic air pressure oscillations within the cavity that stimulate coherent motions of a separated turbulent shear layer that spans the cavity.

46. A method in accordance with claim 41 wherein coupling an aft fairing section to at least a portion of the aircraft fuselage comprises forming a cavity having a predetermined size and orientation to facilitate generating the aeroacoustic resonance within the desired frequency range within the cavity for a predetermined range of aircraft air speeds.

47. A method in accordance with claim 46 wherein forming a cavity comprises configuring the cavity to generate the aeroacoustic resonance within the desired frequency range and at a desired amplitude within the cavity for the predetermined range of aircraft air speeds.

48. A method in accordance with claim 41 wherein coupling an aft fairing section to at least a portion of the aircraft fuselage comprises assembling each of a tapered fairing portion, a fairing lip portion, and an aftmost fairing portion, wherein the tapered fairing portion is positioned adjacent to and aft of the turret section, the fairing lip portion is positioned adjacent to and aft of the tapered fairing portion, and the aftmost fairing portion is positioned adjacent to and aft of the fairing lip portion.

49. A method in accordance with claim 48 wherein assembling a fairing lip portion comprises forming an outer surface having a leading end and an aft end, the outer surface extending between the leading end and the aft end, wherein the leading end defines a first distance extending from the aircraft and the aft end defines a second distance extending from the aircraft, the second distance is one of substantially equal to and greater than the first distance.

50. A method in accordance with claim 41 wherein coupling a turret section to at least a portion of an aircraft fuselage comprises assembling the turret section with an outer surface having a substantially spherical shape with a predetermined radius, wherein the turret radius extends radially outward from a center of the turret section to the outer surface of the turret section.

51. A method in accordance with claim 41 wherein coupling an aft fairing section to at least a portion of the aircraft fuselage comprises:

assembling each of a tapered fairing portion and a fairing lip portion, wherein the tapered fairing portion is positioned adjacent to and aft of the turret section, the fairing lip portion is positioned adjacent to and aft of the tapered fairing portion, wherein the fairing lip portion includes an outer surface extending a first distance from a portion of the aircraft through an elevation plane and the turret section comprises an outer surface extending a second distance from a portion of the aircraft through the elevation plane, wherein a difference value between the first distance and the second distance is predetermined; and defining the predetermined height difference for facilitating tuning of the aeroacoustic resonances, thereby facilitating regularizing concomitant aero-optic aberrations within the desired frequency range in an area aft of the turret section.

52. A method in accordance with claim 41 wherein coupling a moveable cover to at least a portion of the tapered fairing portion comprises configuring the moveable cover to:
  move to the closed position when the directed energy beam is transmitted from the directed energy device and the directed energy device has an elevation ranging between approximately 0 degrees and approximately 85 degrees; and
  move to the open position when the directed energy beam is transmitted from the directed energy device and the directed energy device has an elevation that is greater than approximately 85 degrees.

53. A method in accordance with claim 41 wherein coupling an aft fairing section to at least a portion of the aircraft fuselage comprises:
  positioning a tapered fairing portion aft of the turret section;
  positioning a fairing lip portion aft of the tapered fairing portion, the fairing lip portion having a cavity;
  coupling a computer processor in communication with the at least one sensor; and
  programming the computer processor to:
    receive from the at least one sensor a signal substantially representative of an air pressure within the cavity;
    control the directed energy device based on the received air pressure signal; and
    enable the directed energy device to transmit a directed energy beam with a conjugate wavefront.

54. A method in accordance with claim 41 wherein coupling an aft fairing section to at least a portion of the aircraft fuselage comprises:
  positioning a tapered fairing portion aft of the turret section;
  positioning a fairing lip portion aft of the tapered fairing portion, defining a cavity within the fairing lip portion, the tapered fairing portion and the fairing lip portion direct airflow to generate aeroacoustic resonances, thereby facilitating regularizing concomitant aero-optic aberrations within a desired frequency range in an area aft of the turret section;
  coupling a computer processor in communication with the at least one sensor; and
  programming the computer processor to:
    determine effects of the separated turbulent shear layer on the directed energy beam including distortions to a phase of the energy beam's wavefront; and
    determine an adjusted phase of the directed energy beam prior to transmission through the separated turbulent shear layer based on the determined effects such that the energy beam's wavefront is optimized after transmission through the separated turbulent shear layer.

55. A method in accordance with claim 54 further comprising:
  coupling an adaptive optic device to the at least one computer processor; and
  programming the at least one computer processor and configuring the adaptive optic device to adjust the phase of the energy beam's wavefront prior to transmission through the separated turbulent shear layer such that the energy beam's wavefront is optimized after transmission through the separated turbulent shear layer.

* * * * *